United States Patent
Chawla et al.

(10) Patent No.: US 11,853,782 B2
(45) Date of Patent: Dec. 26, 2023

(54) METHOD AND SYSTEM FOR COMPOSING SYSTEMS USING RESOURCE SETS

(71) Applicant: Dell Products L.P., Hopkinton, MA (US)

(72) Inventors: Gaurav Chawla, Austin, TX (US); Mark Steven Sanders, Roanoke, VA (US); William Price Dawkins, Lakeway, TX (US); Jimmy Doyle Pike, Georgetown, TX (US); Elie Antoun Jreij, Pflugerville, TX (US); Robert Wayne Hormuth, Cedar Park, TX (US); Walter A. O'Brien, III, Westborough, MA (US); Mukund P. Khatri, Austin, TX (US); Yossef Saad, Ganei Tikva (IL)

(73) Assignee: Dell Products L.P., Round Rock, TX (US)

( * ) Notice: Subject to any disclaimer, the term of this patent is extended or adjusted under 35 U.S.C. 154(b) by 166 days.

(21) Appl. No.: 17/117,038

(22) Filed: Dec. 9, 2020

(65) Prior Publication Data
US 2022/0179672 A1  Jun. 9, 2022

(51) Int. Cl.
*G06F 9/455* (2018.01)
*G06F 9/50* (2006.01)

(52) U.S. Cl.
CPC ...... *G06F 9/45541* (2013.01); *G06F 9/45558* (2013.01); *G06F 9/5011* (2013.01);
(Continued)

(58) Field of Classification Search
CPC ............ G06F 9/45541; G06F 9/45558; G06F 9/5011; G06F 9/5077; G06F 2009/4557;
(Continued)

(56) References Cited

U.S. PATENT DOCUMENTS 7,478,117 B1  1/2009 Lamb et al.
7,606,892 B2  10/2009 Piet et al.
(Continued)

OTHER PUBLICATIONS

Anonymous: "Dell Chassis Management Controller Version 6.20 for PowerEdge M1000e" Dec. 3, 2018 (Dec. 3, 2018) 274 pages, Retrieved from the Internet: URL:https://dl/del/com/topicspdf/dell-chassis-management-controller-v620-poweredge-m1000e_users-guide_en-us.pdf.
(Continued)

*Primary Examiner* — Michael W Ayers
(74) *Attorney, Agent, or Firm* — Chamberlain, Hrdlicka, White, Williams & Aughtry

(57) ABSTRACT

A device for managing composition of composed information handling includes persistent storage and a computer processor that obtains a composition request for a composed information handling system; makes a determination that the composition request is an intent based request; in response to the determination: matches an application specified by the composition request to computing resource requirements for the application; identifies, based on the computing resource requirements, at least one compute resource set having resources meeting the computing resources requirement; identifies, based on the computing resource requirements, at least one hardware resource set having resources meeting the computing resource requirements; sets up management services for the at least one hardware resource set using at least one control resource set to obtain logical hardware resources; and presents the logical hardware resources to the at least one compute resource set as bare metal resources.

20 Claims, 14 Drawing Sheets

(52) U.S. Cl.
CPC .......... *G06F 9/5077* (2013.01); *G06F 9/5044* (2013.01); *G06F 9/5072* (2013.01); *G06F 2009/4557* (2013.01); *G06F 2209/508* (2013.01)

(58) Field of Classification Search
CPC . G06F 2209/508; G06F 9/5072; G06F 9/5044
See application file for complete search history.

(56) References Cited

U.S. PATENT DOCUMENTS

| | | | |
|---|---|---|---|
| 7,620,984 | B2 | 11/2009 | Kallahalla |
| 8,095,929 | B1 | 1/2012 | Ji et al. |
| 8,276,140 | B1 | 9/2012 | Beda, III et al. |
| 8,285,747 | B1 | 10/2012 | English |
| 8,306,948 | B2 | 11/2012 | Chou |
| 8,499,066 | B1 | 7/2013 | Zhang et al. |
| 8,589,659 | B1 | 11/2013 | Shapiro |
| 8,606,920 | B1 | 12/2013 | Gupta et al. |
| 8,751,546 | B1 | 6/2014 | Grieve |
| 8,997,242 | B2 | 3/2015 | Chen |
| 9,104,844 | B2 | 8/2015 | Fang |
| 9,105,178 | B2 | 8/2015 | Carlson |
| 9,245,096 | B2 | 1/2016 | Abuelsaad |
| 9,413,819 | B1 | 8/2016 | Berg et al. |
| 9,529,689 | B2 | 12/2016 | Ferris et al. |
| 9,569,598 | B2 | 2/2017 | Abuelsaad |
| 9,600,553 | B1 | 3/2017 | Nigade et al. |
| 9,613,147 | B2 | 4/2017 | Carlson |
| 9,678,977 | B1 | 6/2017 | Aronovich |
| 9,959,140 | B2 | 5/2018 | Jackson |
| 10,097,438 | B2 | 10/2018 | Ferris et al. |
| 10,348,574 | B2 | 7/2019 | Kulkarni |
| 10,382,279 | B2 | 8/2019 | Roese |
| 10,601,903 | B2 | 3/2020 | Bivens |
| 10,628,225 | B2 | 4/2020 | Yamato |
| 10,756,990 | B1 | 8/2020 | Chakkassery Vidyadharan et al. |
| 10,782,882 | B1 | 9/2020 | Wu |
| 10,795,856 | B1 | 10/2020 | Smith et al. |
| 10,848,408 | B2 | 11/2020 | Uriel |
| 10,909,283 | B1 | 2/2021 | Wang et al. |
| 10,994,198 | B1 | 5/2021 | Byskal et al. |
| 11,119,739 | B1 | 9/2021 | Allen et al. |
| 11,134,013 | B1 | 9/2021 | Allen et al. |
| 11,221,886 | B2 | 1/2022 | Bivens et al. |
| 11,537,421 | B1 | 12/2022 | Brooker et al. |
| 2003/0028642 | A1 | 2/2003 | Agarwal et al. |
| 2003/0061262 | A1 | 3/2003 | Hahn et al. |
| 2003/0233427 | A1 | 12/2003 | Taguchi |
| 2004/0257998 | A1 | 12/2004 | Chu et al. |
| 2006/0082222 | A1 | 4/2006 | Pincu et al. |
| 2006/0230407 | A1 | 10/2006 | Rosu et al. |
| 2006/0236100 | A1 | 10/2006 | Baskaran et al. |
| 2008/0052480 | A1 | 2/2008 | Satoyama et al. |
| 2008/0313476 | A1 | 12/2008 | Hansen |
| 2009/0199193 | A1 | 8/2009 | Jackson |
| 2009/0282404 | A1 | 11/2009 | Khandekar et al. |
| 2010/0217865 | A1 | 8/2010 | Ferris |
| 2011/0055378 | A1 | 3/2011 | Ferris et al. |
| 2011/0099147 | A1 | 4/2011 | Mcalister et al. |
| 2011/0154500 | A1 | 6/2011 | Sahita et al. |
| 2011/0307570 | A1 | 12/2011 | Speks |
| 2012/0047328 | A1 | 2/2012 | Williams et al. |
| 2012/0222084 | A1 | 8/2012 | Beaty et al. |
| 2013/0007710 | A1 | 1/2013 | Vedula et al. |
| 2013/0311434 | A1 | 11/2013 | Jones |
| 2013/0332901 | A1 | 12/2013 | Berg et al. |
| 2013/0346718 | A1 | 12/2013 | Meshchaninov et al. |
| 2014/0007097 | A1 | 1/2014 | Chin et al. |
| 2014/0149635 | A1 | 5/2014 | Bacher et al. |
| 2014/0165063 | A1 | 6/2014 | Shiva et al. |
| 2014/0223233 | A1 | 8/2014 | Heyrman et al. |
| 2014/0279884 | A1 | 9/2014 | Dantkale et al. |
| 2014/0282820 | A1 | 9/2014 | Walton et al. |
| 2014/0359356 | A1 | 12/2014 | Aoki |
| 2015/0106165 | A1 | 4/2015 | Rai et al. |
| 2015/0220455 | A1 | 8/2015 | Chen et al. |
| 2015/0317173 | A1 | 11/2015 | Anglin |
| 2015/0381426 | A1 | 12/2015 | Roese et al. |
| 2016/0062441 | A1 | 3/2016 | Chou et al. |
| 2016/0180087 | A1 | 6/2016 | Edwards et al. |
| 2016/0224903 | A1 | 8/2016 | Talathi et al. |
| 2016/0259665 | A1 | 9/2016 | Gaurav et al. |
| 2017/0034012 | A1* | 2/2017 | Douglas ............. H04L 41/0806 |
| 2017/0041184 | A1 | 2/2017 | Broz et al. |
| 2017/0048200 | A1 | 2/2017 | Chastain |
| 2017/0097851 | A1* | 4/2017 | Chen .................. G06F 9/45558 |
| 2017/0118247 | A1 | 4/2017 | Hussain |
| 2017/0195201 | A1 | 7/2017 | Mueller et al. |
| 2017/0201574 | A1 | 7/2017 | Luo |
| 2018/0024964 | A1 | 1/2018 | Mao |
| 2018/0063145 | A1 | 3/2018 | Cayton et al. |
| 2019/0065061 | A1 | 2/2019 | Kim et al. |
| 2019/0065256 | A1 | 2/2019 | Hamilton et al. |
| 2019/0079837 | A1 | 3/2019 | Agarwal et al. |
| 2019/0164087 | A1 | 5/2019 | Ghibril et al. |
| 2019/0188014 | A1 | 6/2019 | Easterling et al. |
| 2019/0190778 | A1 | 6/2019 | Easterling et al. |
| 2019/0205180 | A1 | 7/2019 | Macha et al. |
| 2019/0227616 | A1 | 7/2019 | Jenne et al. |
| 2019/0324808 | A1 | 10/2019 | Krishnan et al. |
| 2019/0334774 | A1 | 10/2019 | Bennett et al. |
| 2019/0356729 | A1 | 11/2019 | Bivens et al. |
| 2019/0356731 | A1 | 11/2019 | Bivens et al. |
| 2019/0384516 | A1 | 12/2019 | Bernat |
| 2019/0384648 | A1 | 12/2019 | Wiggers et al. |
| 2019/0386902 | A1 | 12/2019 | Mueller et al. |
| 2020/0026564 | A1* | 1/2020 | Bahramshahry ........................... G06Q 10/06316 |
| 2020/0028854 | A1 | 1/2020 | Fabrizi et al. |
| 2020/0034221 | A1 | 1/2020 | Ganesan et al. |
| 2020/0034528 | A1 | 1/2020 | Yang et al. |
| 2020/0044966 | A1 | 2/2020 | Krishnan et al. |
| 2020/0065254 | A1* | 2/2020 | Cao ...................... G06F 3/0607 |
| 2020/0097358 | A1 | 3/2020 | Mahindru et al. |
| 2020/0174949 | A1 | 6/2020 | Ramasamy et al. |
| 2020/0218561 | A1 | 7/2020 | Lal et al. |
| 2020/0233582 | A1 | 7/2020 | Chen et al. |
| 2020/0293375 | A1 | 9/2020 | Klein |
| 2020/0341786 | A1 | 10/2020 | Soryal |
| 2020/0341798 | A1 | 10/2020 | Duleba |
| 2020/0351221 | A1 | 11/2020 | Subramani et al. |
| 2020/0356200 | A1 | 11/2020 | Blanco et al. |
| 2020/0358714 | A1 | 11/2020 | Singleton, IV et al. |
| 2020/0364001 | A1* | 11/2020 | Bhandari ................ G06F 3/067 |
| 2021/0019062 | A1 | 1/2021 | Fessel |
| 2021/0019162 | A1 | 1/2021 | Viswanathan et al. |
| 2021/0037466 | A1 | 2/2021 | Silva et al. |
| 2021/0111942 | A1 | 4/2021 | Tahhan et al. |
| 2021/0117389 | A1 | 4/2021 | Cui et al. |
| 2021/0117441 | A1 | 4/2021 | Patel et al. |
| 2021/0152659 | A1* | 5/2021 | Cai ........................ H04L 67/62 |
| 2021/0185565 | A1* | 6/2021 | Kalderen ................ H04W 8/04 |
| 2021/0224093 | A1 | 7/2021 | Fu et al. |
| 2021/0367901 | A1 | 11/2021 | Singh et al. |
| 2021/0397494 | A1 | 12/2021 | Graham |
| 2022/0179701 | A1 | 6/2022 | Saad et al. |
| 2022/0197773 | A1 | 6/2022 | Butler et al. |
| 2023/0026690 | A1 | 1/2023 | Dawkins et al. |
| 2023/0033296 | A1 | 2/2023 | Shetty et al. |

OTHER PUBLICATIONS

International Searching Authority, International Search Report and Written Opinion dated Oct. 21, 2021 for corresponding PCT Application No. PCTUS2021029708 filed Apr. 28, 2021.

International Searching Authority, International Search Report and Written Opinion for corresponding PCT Application No. PCTUS2021029702 filed Apr. 28, 2021, dated Aug. 19, 2021, 13 pages.

International Searching Authority, International Search Report and Written Opinion dated Jul. 19, 2021, issued in corresponding PCT Application No. PCT/US2021/029687, 11 pages.

(56) References Cited

OTHER PUBLICATIONS

International Searching Authority, International Search Report and Written Opinion of corresponding PCT Application No. PCT/US2021/029698, dated Aug. 9, 2021, 15 pages.
Alachiotis, Nikolaos, et al. "dReDBox: A disaggregated architectural perspective for data centers." Hardware Accelerators in Data Centers. Springer, Cham, 2019. pages 35-56. (Year: 2019) (22 pages).
Chunlin, Li et al., "Hybrid Cloud Adaptive Scheduling Strategy for Heterogeneous Workloads", Journal of Grid Computing 17, pp. 419-446, (Year: 2019) (28 pages).
International Search Report and Written Opinion of the International Searching Authority dated Aug. 19, 2021, issued in corresponding PCT Application No. PCT/US2021/029702 (13 pages).
International Search Report and Written Opinion of the International Searching Authority dated Aug. 9, 2021, issued in corresponding PCT Application No. Application No. PCT/US2021/029698 (15 pages).
International Search Report and Written Opinion of the International Searching Authority dated Jul. 19, 2021, issued in corresponding PCT Application No. PCT/US2021/029687 (11 pages).
International Search Report and Written Opinion of the International Searching Authority dated Oct. 21, 2021, issued in corresponding PCT Application No. PCT/US2021/029708 (12 pages).
Mohammadi et al, "Towards an End-to-End Architecture, for Runtime Data Protection in the Cloud", 2018 44th Euromicro Conference on Software Engineering and Advanced Application, 2018, pp. 514-518.

\* cited by examiner

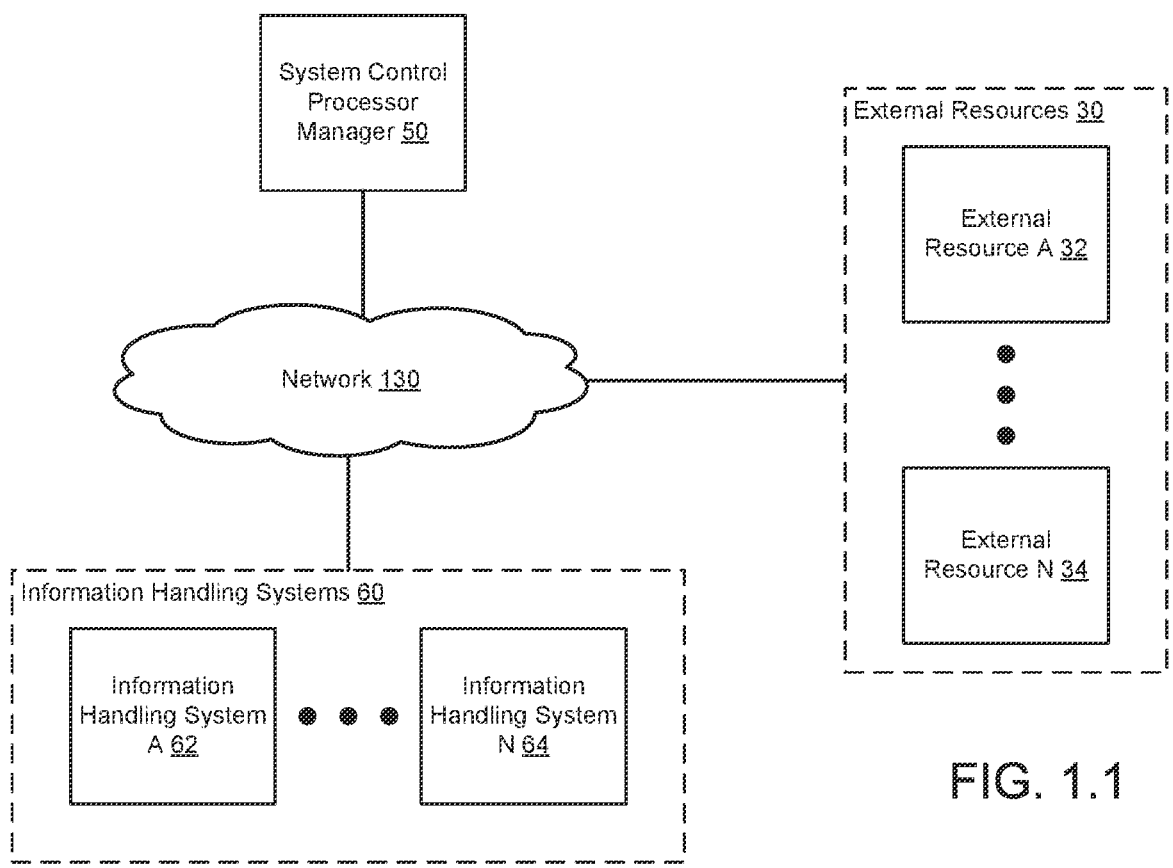
FIG. 1.1

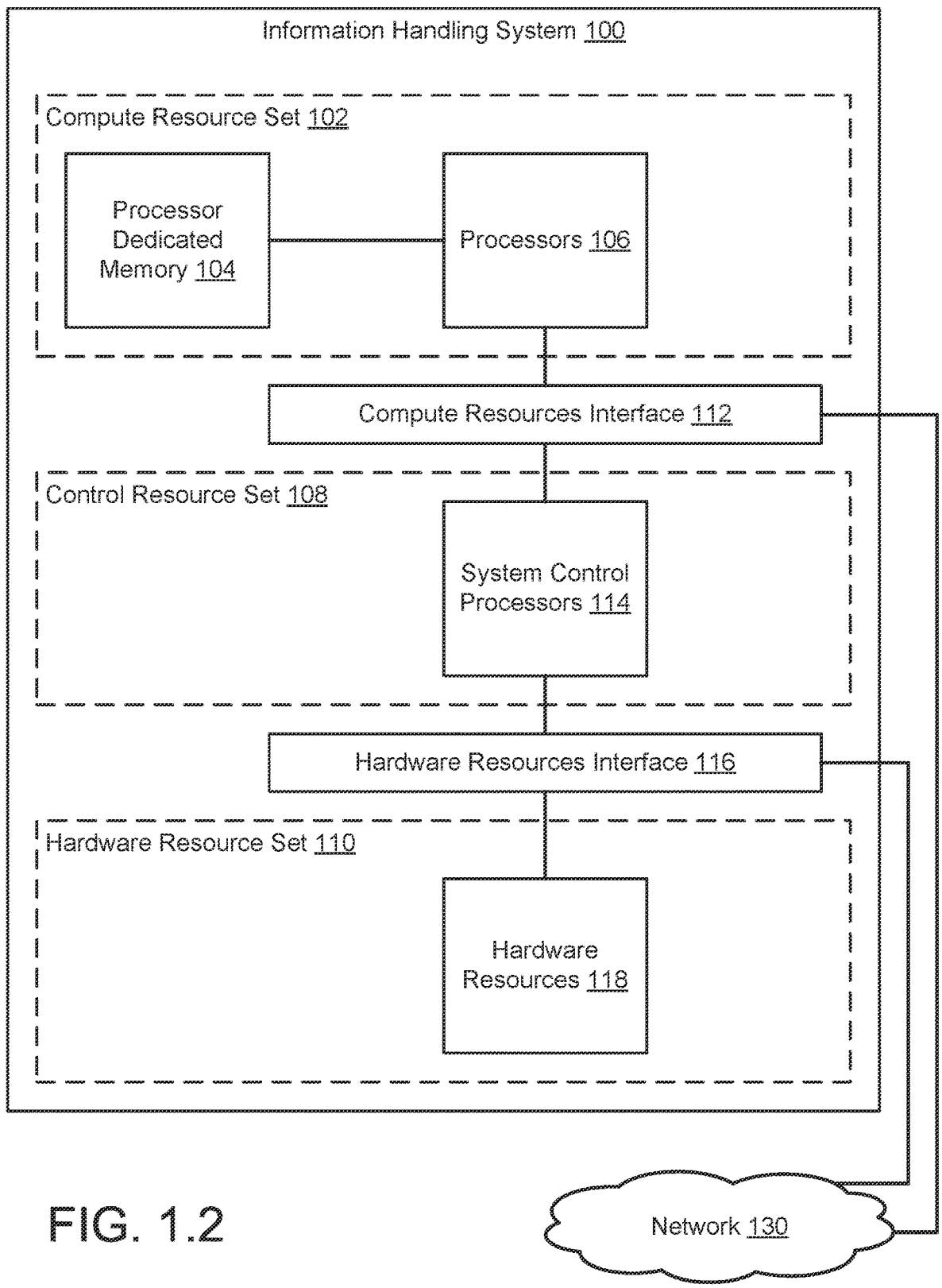
FIG. 1.2

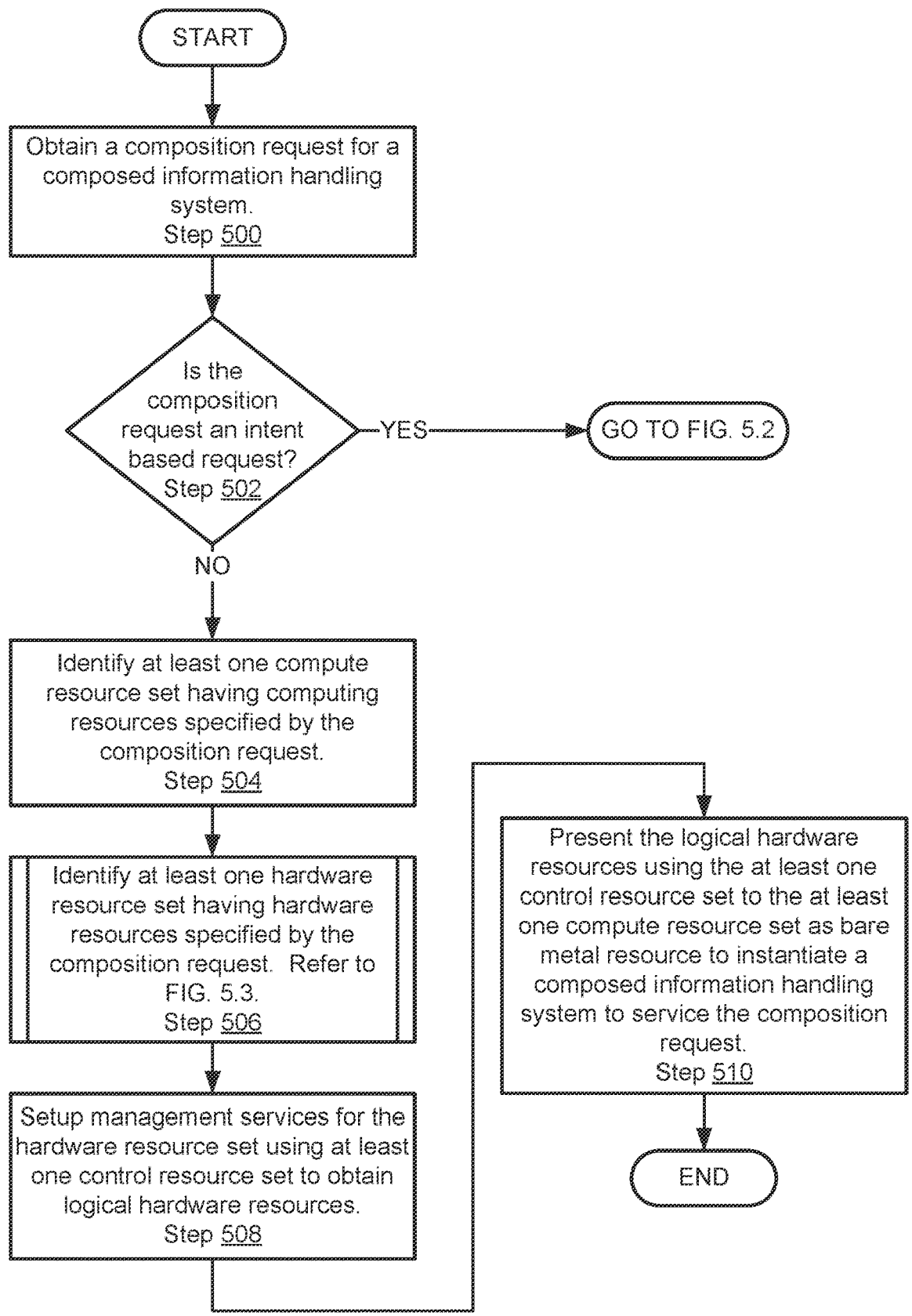
FIG. 5.1

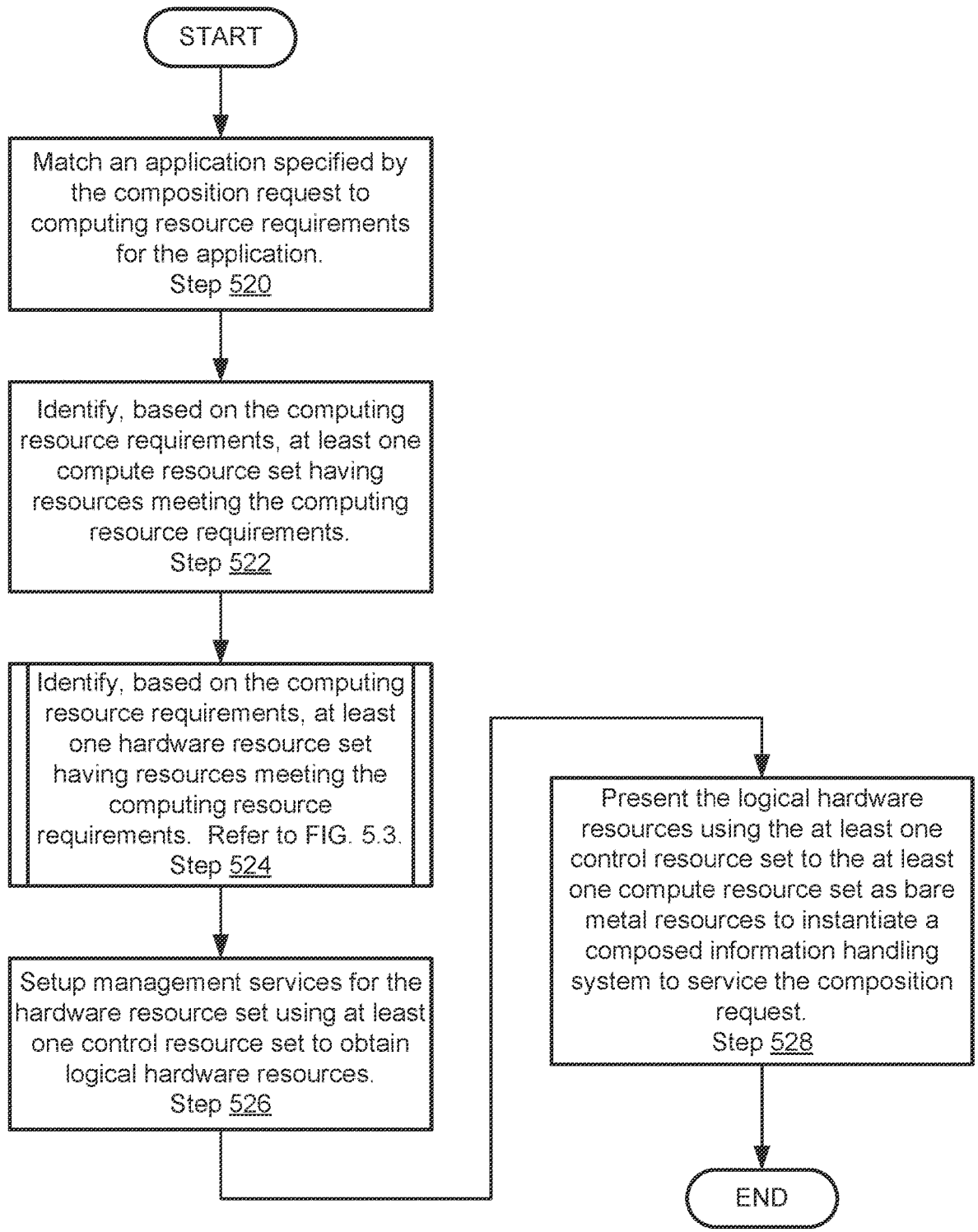
FIG. 5.2

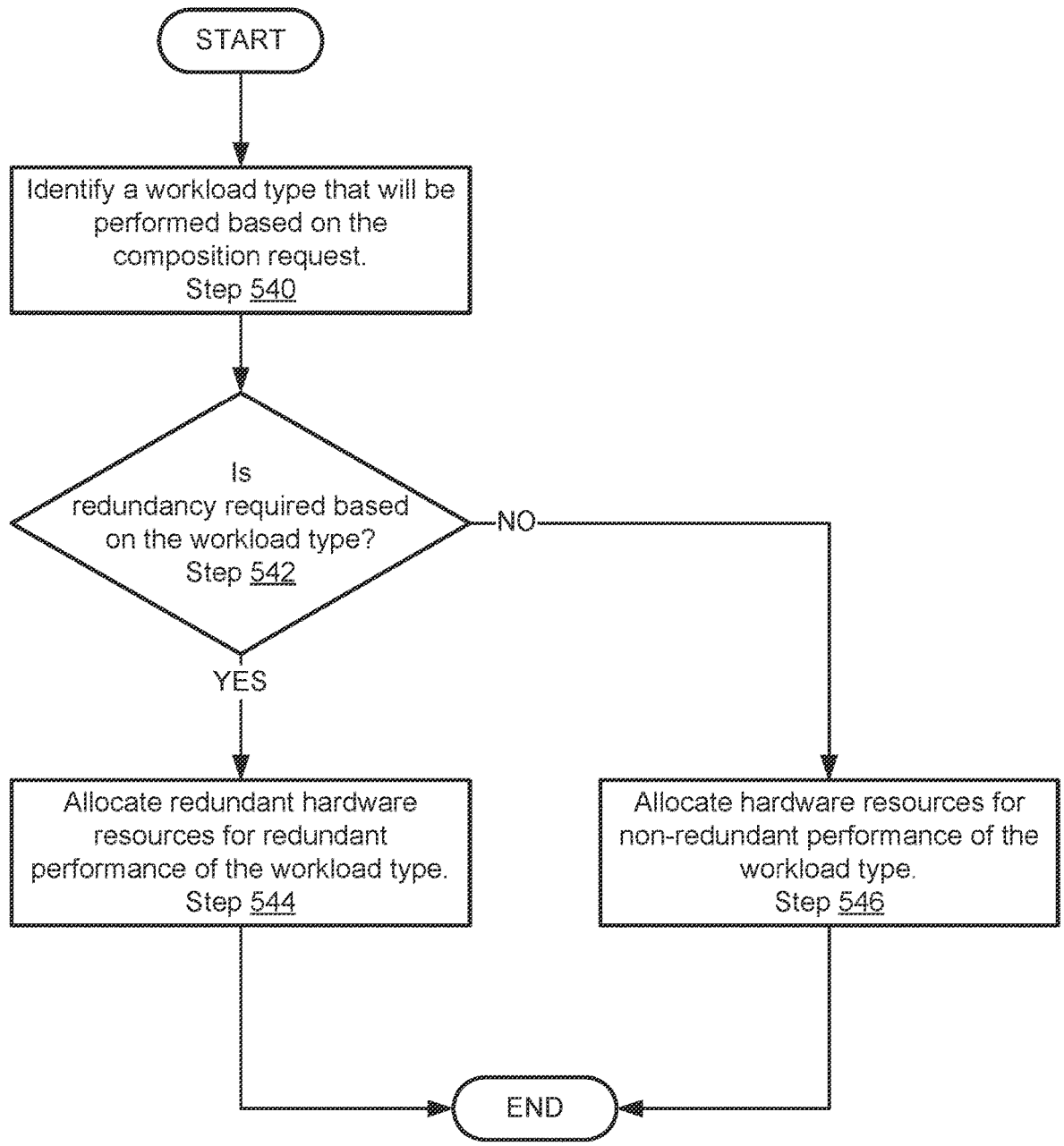
FIG. 5.3

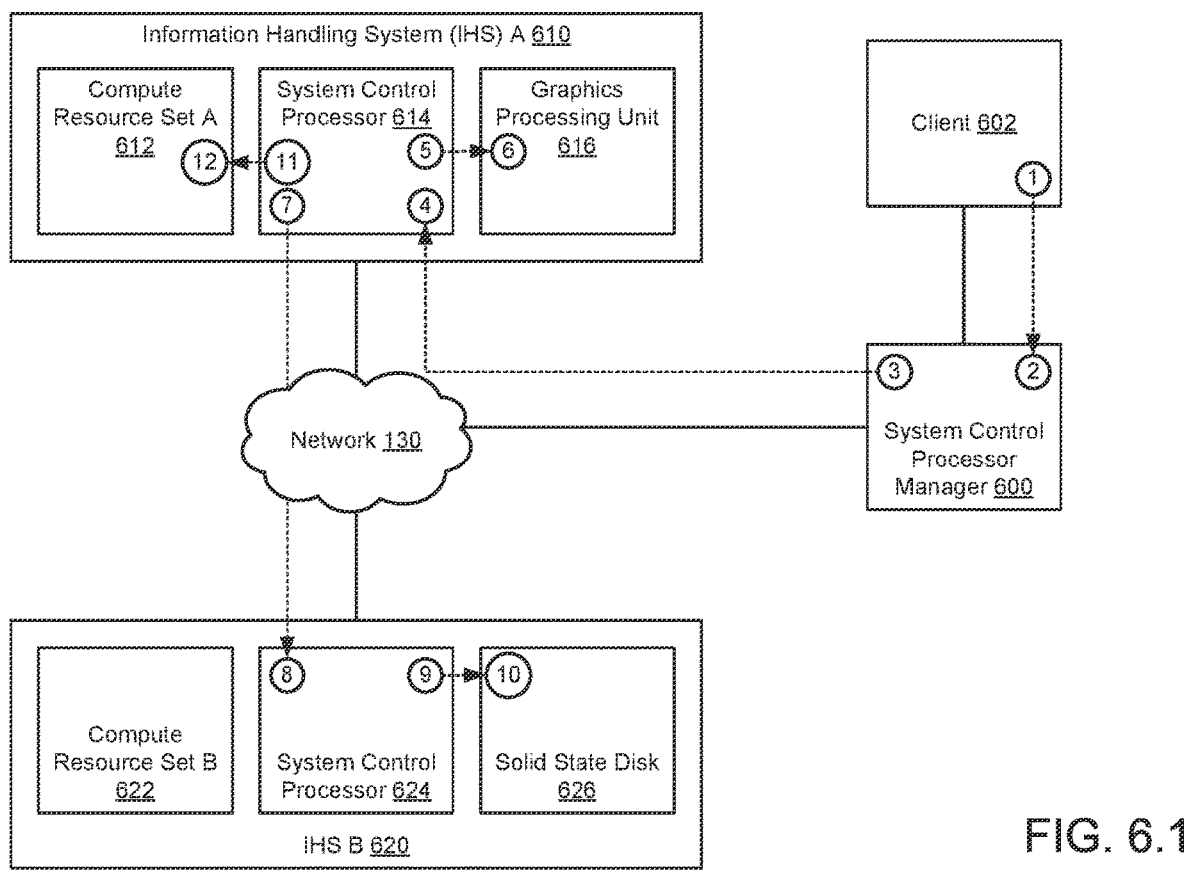
FIG. 6.1

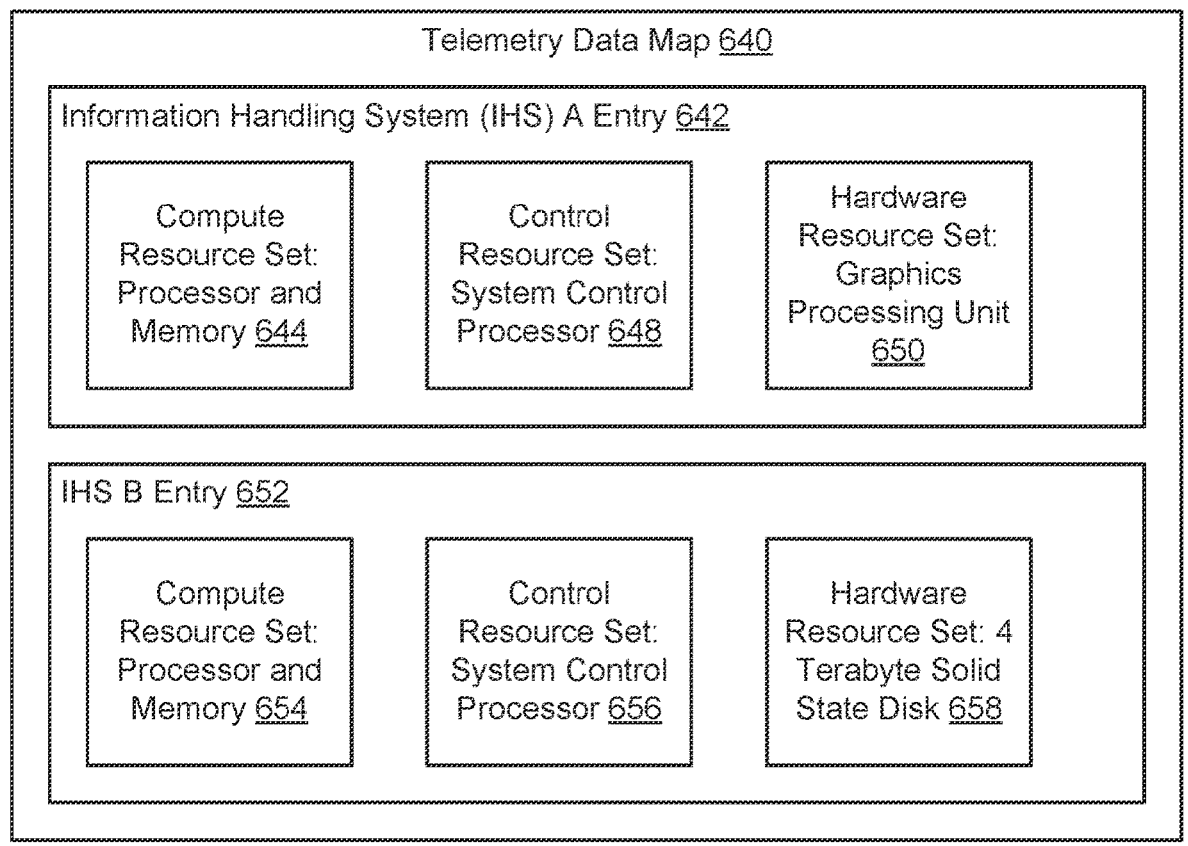
FIG. 6.2

Outcome Based Computing Resource Requirements Lookup Table 660

Database Application Entry 662

| Compute Resources: One Processor, One Gigabyte Memory 664 | Control Resources: Duplicative Data Storage 666 | Hardware Resources: One Terabyte Storage 668 |

Virtual Reality Application Entry 670

| Compute Resource Set: One Processor, Two Gigabytes Memory 672 | Control Resource Set: Error Correction Code Protection 674 | Hardware Resource Set: One Terabyte Solid State Disk, Graphics Processing Unit 676 |

FIG. 6.3

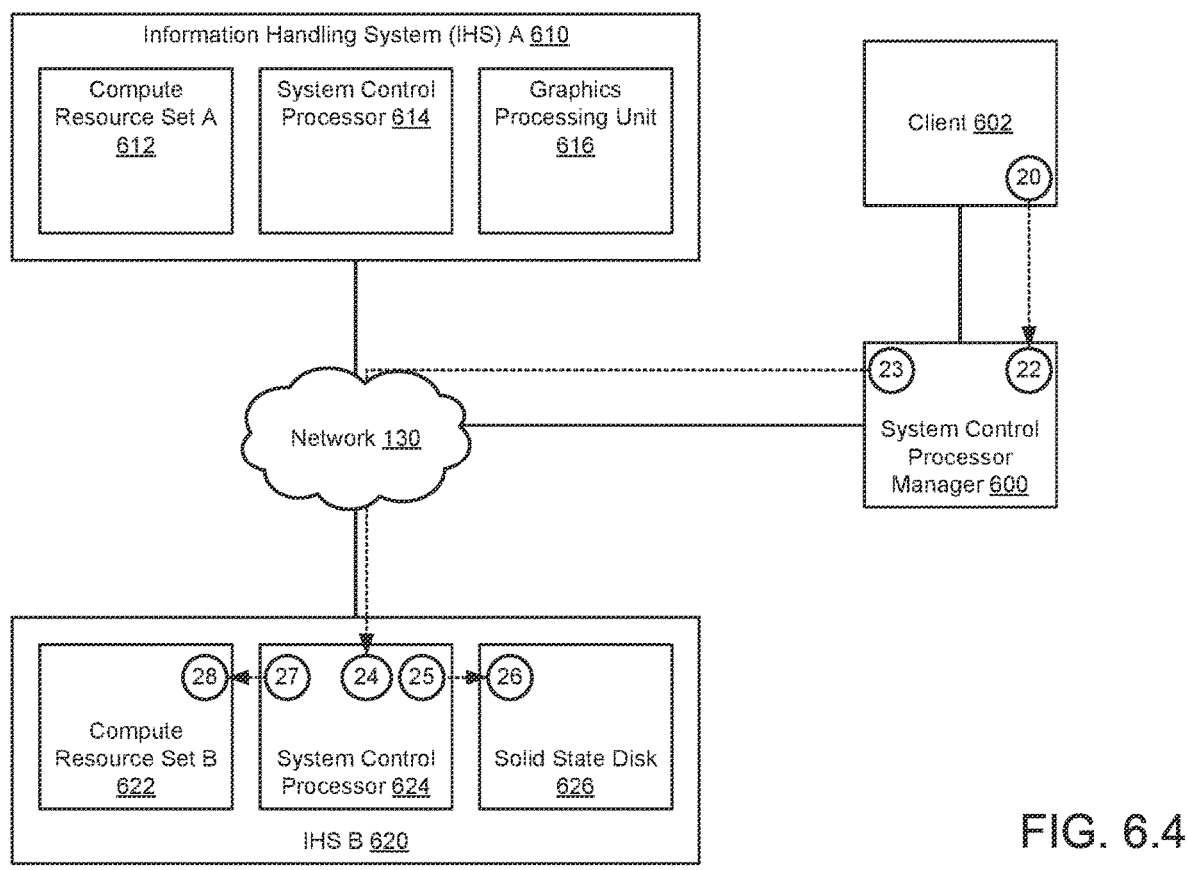
FIG. 6.4

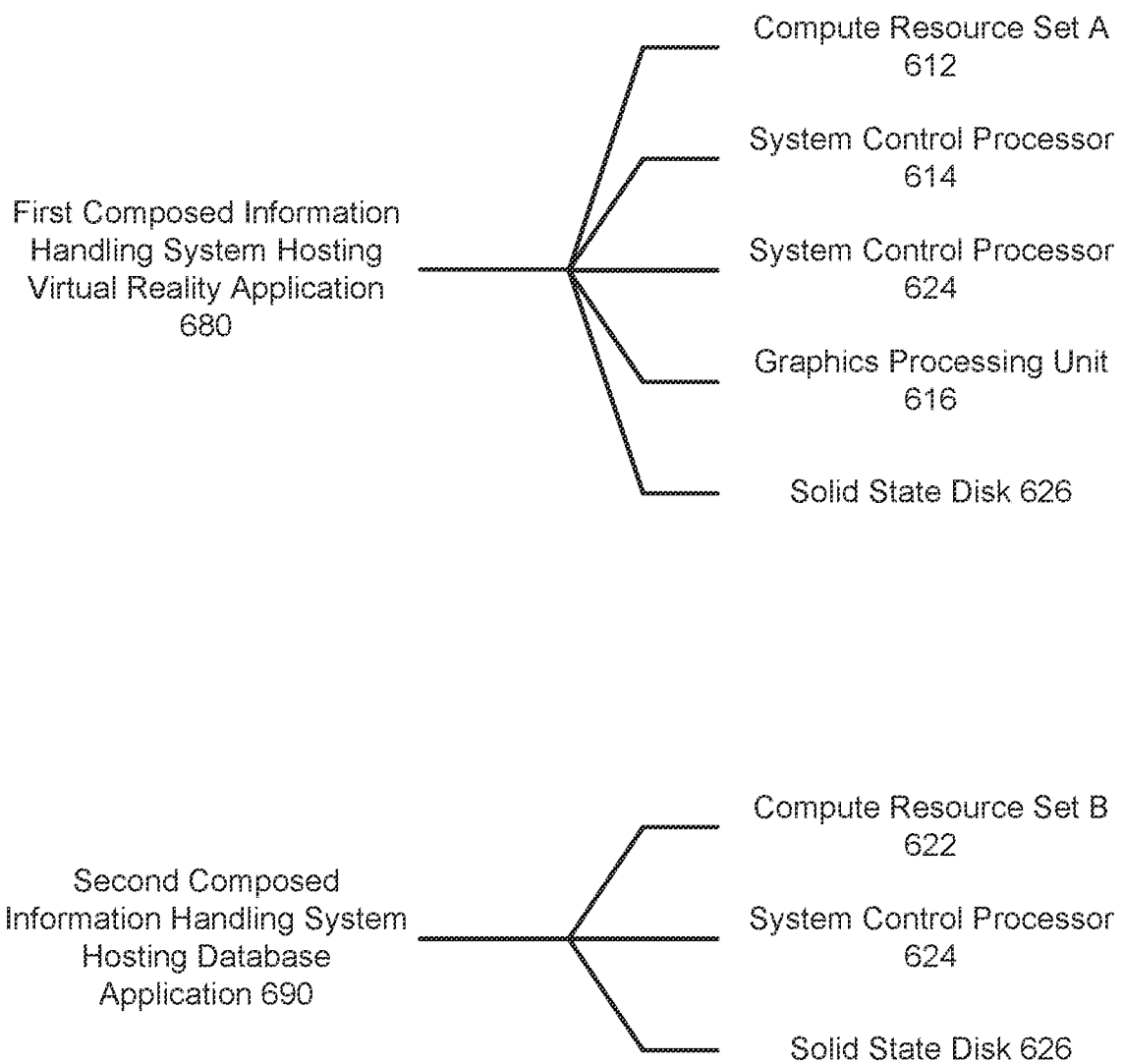
FIG. 6.5

METHOD AND SYSTEM FOR COMPOSING SYSTEMS USING RESOURCE SETS

BACKGROUND

Computing devices may provide services. To provide the services, the computing devices may include hardware components and software components. The services provided by the computing devices may be limited by these components.

SUMMARY

In one aspect, a device for managing composition of composed information handling systems in accordance with one or more embodiments of the invention includes persistent storage and a computer processor. The computer processor obtains a composition request for a composed information handling system of the composed information handling systems; makes a determination that the composition request is an intent based request; in response to the determination: matches an application specified by the composition request to computing resource requirements for the application; identifies, based on the computing resource requirements, at least one compute resource set having resources meeting the computing resources requirement; identifies, based on the computing resource requirements, at least one hardware resource set having resources meeting the computing resource requirements; sets up management services for the at least one hardware resource set using at least one control resource set to obtain logical hardware resources; and presents the logical hardware resources to the at least one compute resource set as bare metal resources using the at least one control resource to instantiate the composed information handling system to service the composition request.

In one aspect, a method for dynamically instantiating composed information handling systems in accordance with one or more embodiments of the invention includes obtaining a composition request for a composed information handling system of the composed information handling systems; making a determination that the composition request is an intent based request; in response to the determination: matching an application specified by the composition request to computing resource requirements for the application; identifying, based on the computing resource requirements, at least one compute resource set having resources meeting the computing resources requirement; identifying, based on the computing resource requirements, at least one hardware resource set having resources meeting the computing resource requirements; setting up management services for the at least one hardware resource set using at least one control resource set to obtain logical hardware resources; and presenting the logical hardware resources to the at least one compute resource set as bare metal resources using the at least one control resource to instantiate the composed information handling system to service the composition request.

In one aspect, a non-transitory computer readable medium in accordance with one or more embodiments of the invention includes computer readable program code, which when executed by a computer processor enables the computer processor to perform a method for dynamically instantiating composed information handling systems. The method includes obtaining a composition request for a composed information handling system of the composed information handling systems; making a determination that the composition request is an intent based request; in response to the determination: matching an application specified by the composition request to computing resource requirements for the application; identifying, based on the computing resource requirements, at least one compute resource set having resources meeting the computing resources requirement; identifying, based on the computing resource requirements, at least one hardware resource set having resources meeting the computing resource requirements; setting up management services for the at least one hardware resource set using at least one control resource set to obtain logical hardware resources; and presenting the logical hardware resources to the at least one compute resource set as bare metal resources using the at least one control resource to instantiate the composed information handling system to service the composition request.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIG. 5.1 shows a flowchart of a method of instantiating a composed information handling system based on a composition request in accordance with one or more embodiments of the invention.

FIG. 5.2 shows a continuation of the flowchart of FIG. 5.1.

FIG. 5.3 shows a flowchart of a method of allocating hardware resources to a composed information handling system in accordance with one or more embodiments of the invention.

FIGS. 6.1-6.5 show diagrams of the operation of an example system over time in accordance with one or more embodiments of the invention.

DETAILED DESCRIPTION

Figure 2:
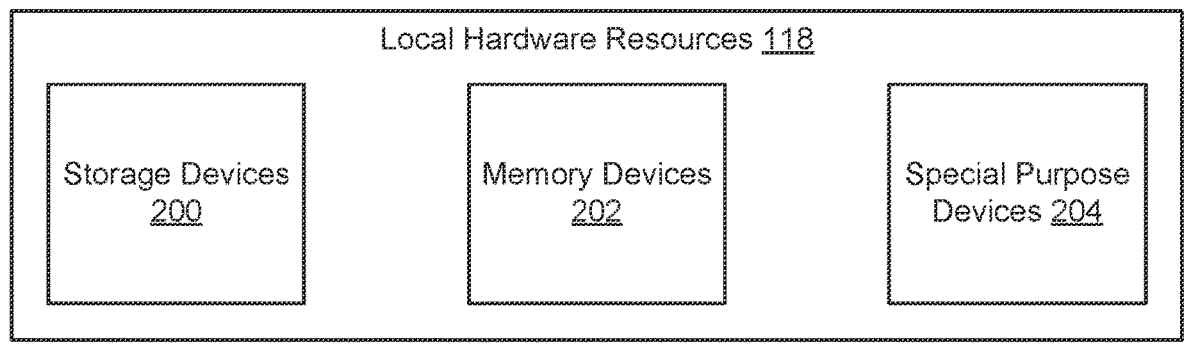
FIG. 2 shows a diagram of hardware resources in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing computer implemented services. To provide computer implemented services, computing resources may need to be allocated for the performance of the services. The services may include, for example, processing resources, memory, resources, storage resources, computing resources, etc.

To allocate the computing resources, composed information handling systems may be instantiated. A composed information handling system may be a device (the components of which may be distributed across one or more information handling systems) that has exclusive use over a quantity of computing resources. Computing resources from multiple information handling systems may be allocated to a composed information handling system thereby enabling a composed information handling system to utilize computing resources from any number of information handling system for performance of corresponding computer implemented services.

To allocate computing resources, the system may include a system control processor manager. The system control processor manager may obtain composition requests. The composition requests may indicate a desired outcome such as, for example, execution of one or more application, providing of one or more services, etc. The system control processor manager may translate the composition requests into corresponding quantities of computing resources necessary to be allocated to satisfy the intent of the composition requests.

Once the quantities of computing resources are obtained, the system control processor manager may allocate resources of the information handling system to meet the identified quantities of computing resources by instructing system control processors of the information handling systems to prepare and present hardware resource sets of the information handling system to compute resource sets of the information handling systems.

Additionally, the system control processor manager may instruct the system control processors to manage the hardware resources of the hardware resource sets in accordance with one or more models (e.g., data integrity, security, etc.). However, when the system control processors present these resources to the compute resource sets, the system control processors may present the resources as bare metal resources while managing them in more complex manners. By doing so, embodiments of the invention may provide a framework for unified security, manageability, resource management/composability, workload management, and distributed system management by use of system control processors of information handling systems.

Managing computing resources of information handling systems in this manner may enable the computing resources to be differentiated to provide different functionalities including, for example, server, storage, networking, data protection, mass storage, etc. Consequently, composed information handling systems having these desired functionalities may be efficiently instantiated.

FIG. 1.1 shows a system in accordance with one or more embodiments of the invention. The system may include any number of information handling systems (60). The information handling systems (60) may provide computer implemented services. The computer implemented services may include, for example, database services, data storage services, electronic communication services, data protection services, and/or other types of services that may be implemented using information handling systems.

The information handling system of the system of FIG. 1.1 may operate independently and/or cooperatively to provide the computer implemented services. For example, a single information handling system (e.g., 62) may provide a computer implemented service on its own (i.e., independently) while multiple other information handling systems (e.g., 62, 64) may provide a second computer implemented service cooperatively (e.g., each of the multiple other information handling systems may provide similar and or different services that form the cooperatively provided service).

To provide computer implemented services, the information handling systems (60) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

The type and quantity of computing resources required to provide computer implemented services may vary depending on the type and quantity of computer implemented services to be provided. For example, some types of computer implemented services may be more compute intensive (e.g., modeling) while other computer implemented services may be more storage intensive (e.g., database) thereby having different computing resource requirements for these different services. Consequently, computing resources may be used inefficiently if the quantity of computing resources is over-allocated for the computer implemented services. Similarly, the quality of the provided computer implemented services may be poor or otherwise undesirable if computing resources are under-allocated for the computer implemented services.

In general, embodiments of the invention relate to system, methods, and devices for managing the hardware resources of the information handling systems (60) and/or other resources (e.g., external resources (30)) to provide computer implemented services. The hardware resources of the information handling systems (60) may be managed by instantiating one or more composed information handling systems using the hardware resources of the information handling systems (60), external resources (30), and/or other types of hardware devices operably connected to the information handling systems (60). Consequently, the computing resources allocated to a composed information handling system may be tailored to the specific needs of the services that will be provided by the composed information handling system.

In one or more embodiments of the invention, the system includes a system control processor manager (50). The system control processor manager (50) may provide composed information handling system composition services. Composed information handling system composition services may include (i) obtaining composition requests for composed information handling systems and (ii) aggregating computing resources from the information handling systems (60) and/or external resources (30) using system control processors to service the composition requests by instantiating composed information handling systems in accordance with the requests. By doing so, instantiated composed information handling systems may provide computer implemented services in accordance with the composition requests.

In one or more embodiments of the invention, the system control processor manager (50) instantiates composed information handling systems in accordance with a three resource set model. As will be discussed in greater detail below, the computing resources of an information handling system may be divided into three logical resource sets: a compute resource set, a control resource set, and a hardware resource set. Different resource sets, or portions thereof, from the same or different information handling systems may be aggregated (e.g., caused to operate as a computing device) to instantiate a composed information handling system having at least one resource set from each set of the three resource set model.

By logically dividing the computing resources of an information handling system into these resource sets, different quantities and types of computing resources may be allocated to each composed information handling system thereby enabling the resources allocated to the respective information handling system to match performed workloads. Further, dividing the computing resources in accordance with the three set model may enable different resource sets to be differentiated (e.g., given different personalities) to provide different functionalities. Consequently, composed information handling systems may be composed on the basis of desired functionalities rather than just on the basis of aggregate resources to be included in the composed information handling system.

Additionally, by composing composed information handling systems in this manner, the control resource set of each composed information handling system may be used to consistently deploy management services across any number of composed information handling systems. Consequently, embodiments of the invention may provide a framework for unified security, manageability, resource management/composability, workload management, and distributed system management by use of this three resource set model. For additional details regarding the system control processor manager (50), refer to FIG. 4.

In one or more embodiments of the invention, a composed information handling system is a device that is formed using all, or a portion, of the computing resources of the information handling systems (60), the external resources (30), and/or other types of hardware devices operably connected to the information handling systems (60). The composed information handling system may utilize the computing resources allocated to it to provide computer implemented services. For example, the composed information handling system may host one or more applications that utilize the computing resources assigned to the composed information handling system. The applications may provide the computer implemented services.

To instantiate composed information handling systems, the information handling systems (60) may include at least three resource sets including a control resource set. The control resource set may include a system control processor. The system control processor of each information handling system may coordinate with the system control processor manager (50) to enable composed information handling systems to be instantiated. For example, the system control processor of an information handling system may provide telemetry data regarding the computing resources of an information handling system, may perform actions on behalf of the system control processor manager (50) to aggregate computing resources together, may organize the performance of duplicative workloads to improve the likelihood that workloads are completed, and/or may provide services that unify the operation of composed information handling systems.

In one or more embodiments of the invention, compute resource sets of composed information handling systems are presented with bare metal resources by control resource sets even when the presented resources are actually being managed using one or more layers of abstraction, emulation, virtualization, security model, etc. For example, the system control processors of the control resource sets may provide the abstraction, emulation, virtualization, and/or other services while presenting the resources as bare metal resources. Consequently, these services may be transparent to applications hosted by the compute resource sets of composed information handling systems thereby enabling uniform deployment of such services without requiring implementation of control plane entities hosted by the compute resource sets of the composed information handling systems. For additional details regarding the information handling systems (60), refer to FIG. 1.2.

The external resources (30) may provide computing resources that may be allocated for use by composed information handling systems. For example, the external resources (30) may include hardware devices that provide any number and type of computing resources. The composed information handling system may use these resources to provide their functionalities. Different external resources (e.g., 32, 34) may provide similar or different computing resources.

The system of FIG. 1.1 may include any number of information handling systems (e.g., 62, 64), any number of external resources (e.g., 32, 34), and any number of system control processor managers (e.g., 50). Any of the components of FIG. 1.1 may be operably connected to any other component and/or other components not illustrated in FIG. 1.1 via one or more networks (e.g., 130). The networks may be implemented using any combination of wired and/or wireless network topologies.

The system control processor manager (50), information handling systems (60), and/or external resources (30) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor manager (50), information handling systems (60), and/or external resources (30) described in this application and/or all, or a portion, of the methods illustrated in FIGS. 5.1-5.3. The system control processor manager (50), information handling systems (60), and/or external resources (30) may be implemented using other types of computing devices without departing from the invention. For additional details regarding computing devices, refer to FIG. 7.

While the information handling systems (60) has been illustrated and described as including a limited number of specific components, an information handling system in accordance with embodiments of the invention may include additional, fewer, and/or different components without departing from the invention.

Turning to FIG. 1.2, FIG. 1.2 shows a diagram of an information handling system (100) in accordance with one or more embodiments of the invention. Any of the information handling systems (e.g., 60) of FIG. 1.1 may be similar to the information handling system (100) illustrated in FIG. 1.2.

As discussed above, the information handling system (100) may provide any quantity and type of computer implemented services. To provide the computer implemented services, resources of the information handling system may be used to instantiate one or more composed information handling systems. The composed information handling systems may provide the computer implemented services.

To provide computer implemented services, the information handling system (100) may include any number and type of hardware devices including, for example, one or more processors (106), any quantity and type of processor dedicated memory (104), one or more system control processors (114), and any number of hardware resources (118). These hardware devices may be logically divided into three resource sets including a compute resource set (102), a control resource set (108), and a hardware resource set (110).

The control resource set (108) of the information handling system (100) may facilitate formation of composed information handling systems. To do so, the control resource set (108) may prepare any quantity of resources from any number of hardware resource sets (e.g., 110) (e.g., of the information handling system (100) and/or other information handling systems) for presentation to processing resources of any number of computing resource sets (e.g., 102) (e.g., of the information handling system (100) and/or other information handling systems). Once prepared, the control resource set (108) may present the prepared resources as bare metal resources to the processors (e.g., 106) of the allocated computing resources. By doing so, a composed information handling system may be instantiated.

To prepare the resources of the hardware resource sets for presentation, the control resource set (108) may employ, for example, virtualization, indirection, abstraction, and/or emulation. These management functionalities may be transparent to applications hosted by the resulting instantiated composed information handling systems. Consequently, while unknown to the control plane entities of the composed information handling system, the composed information handling system may operate in accordance with any number of management models thereby providing for unified control and management of composed information handling systems. These functionalities may be transparent to applications hosted by composed information handling systems thereby relieving them from overhead associated with these functionalities.

For example, consider a scenario where a compute resource set is instructed to instantiate a composed information handling system including a compute resource set and a hardware resource set that will contribute storage resources to the compute resource set. The compute resource set may virtualize the storage resources of the hardware resource set to enable a select quantity of the storage resources to be allocated to the composed information handling system while reserving some of the storage resources for allocation to other composed information handling systems. However, the prepared storage resources may be presented to the compute resource set as bare metal resources. Consequently, the compute resource set may not need to host any control plane entities or otherwise incur overhead for utilizing the virtualized storage resources.

In one or more embodiments of the invention, a management model is a method of managing computing resources (e.g., computing resources provided by one or more hardware devices) in a particular manner. The method of managing the computing resources may give rise to additional functionality for the computing resources. For example, a management model may be to automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and numbers of management models may be implemented to provide additional functionalities using the computing resources without departing from the invention The compute resource set (102) may include one or more processors (106) operably connected to the processor dedicated memory (104). Consequently, the compute resource set (102) may host any number of executing processes thereby enabling any number and type of workloads to be performed. When performing the workloads, the compute resource set (102) may utilize computing resources provided by the hardware resource set (110) of the information handling system (100), hardware resource sets of other information handling systems, and/or external resources.

The processors (106) of the compute resource set (102) may be operably connected to one or more system control processors (114) of the control resource set (108). For example, the processors (106) may be connected to a compute resource interface (112), which is also connected to the system control processors (114).

The system control processors (114) of the hardware resource set (110) may present computing resources to the processors (106) as bare metal resources. In other words, from the point of view of the processors (106), any number of bare metal resources may be operably connected to it via the compute resources interface (112) when, in reality, the system control processors (114) are operably connected to the processors (106) via the compute resources interface (112). In other words, the system control processors (114) may manage presentation of other types of resources to the compute resource set (102).

By presenting the computing resources to the processors as bare metal resources, control plane entities (e.g., applications) such as hypervisors, emulators, and/or other types of management entities may not need to be hosted (e.g., executed) by the processors (106) for the processors (106)

and entities hosted by them to utilize the computing resources allocated to a composed information handling system. Accordingly, all of the processing resources provided by the compute resource set (102) may be dedicated to providing the computer implemented services.

For example, the processors (106) may utilize mapped memory addresses to communicate with the bare metal resources presented by the system control processors (114) to the processors (106). The system control processors (114) may obtain these communications and appropriately remap (e.g., repackage, redirect, encapsulate, etc.) the communications to the actual hardware devices providing the computing resources, which the processors (106) are interacting with via the compute resources interface (112) and/or hardware resources interface (116), discussed below. Consequently, indirection, remapping, and/or other functions required for resource virtualization, emulation, abstraction, or other methods of resource allocation (other than bare metal) may not need to be implemented via the processors (106).

By doing so, any number of functions for a composed information handling system may be automatically performed in a manner that is transparent to the control plane. Accordingly, a composed information handling system may operate in a manner consistent with a unified, consistent architecture or model (e.g., communications model to facilitate improved likelihood of network communications being received such as by establishing virtual private networks between system control processors of a composed information handling system, data storage model such as redundantly storing copies of data or adding error correction data to data to improve its ability to be read, etc.) by configuring the operation of one or more system control processors in a manner consistent with the architecture or model.

In one or more embodiments of the invention, control plane entities utilize computing resources presented through one or more layers of indirection, abstraction, virtualization, etc. In other words, an indirect user of hardware devices and computing resources provided thereby.

In one or more embodiments of the invention, data plane entities directly utilize computing resources. For example, data plane entities may instruct hardware devices on their operation thereby directly utilizing computing resources provided thereby. Data plane entities may present the computing resources to control plane entities using one or more layers of indirection, abstraction, virtualization, etc.

The system control processors (114) may present any number of resources operably connected to it (e.g., the hardware resource set (110)), other resources operably connected to it via an interface (e.g., hardware resources interface (116), etc.) as bare metal resources to the processors (106) of the compute resource set (102). Consequently, the system control processors (114) may implement device discovery processes compatible with the processors (106) to enable the processors (106) to utilize the presented computing resources.

For example, the hardware resource set (110) may include hardware resources (118) operably connected to the system control processors (114) via a hardware resources interface (116). The hardware resources (118) may include any number and type of hardware devices that provide computing resources. For additional details regarding the hardware resources (118), refer to FIG. 2.

In another example, the system control processors (114) may be operably connected to other hardware resource sets of other information handling systems via hardware resources interface (116), network (130), and/or other system control processors of the other information handling systems. The system control processors may cooperatively enable hardware resource sets of other information handling systems to be prepared and presented as bare metal resources to the compute resource set (102).

In an additional example, the system control processors (114) may be operably connected to external resources via hardware resources interface (116) and network (130). The system control processors (114) may prepare and present the external resources as bare metal resources to the compute resource set (102).

Figure 3:
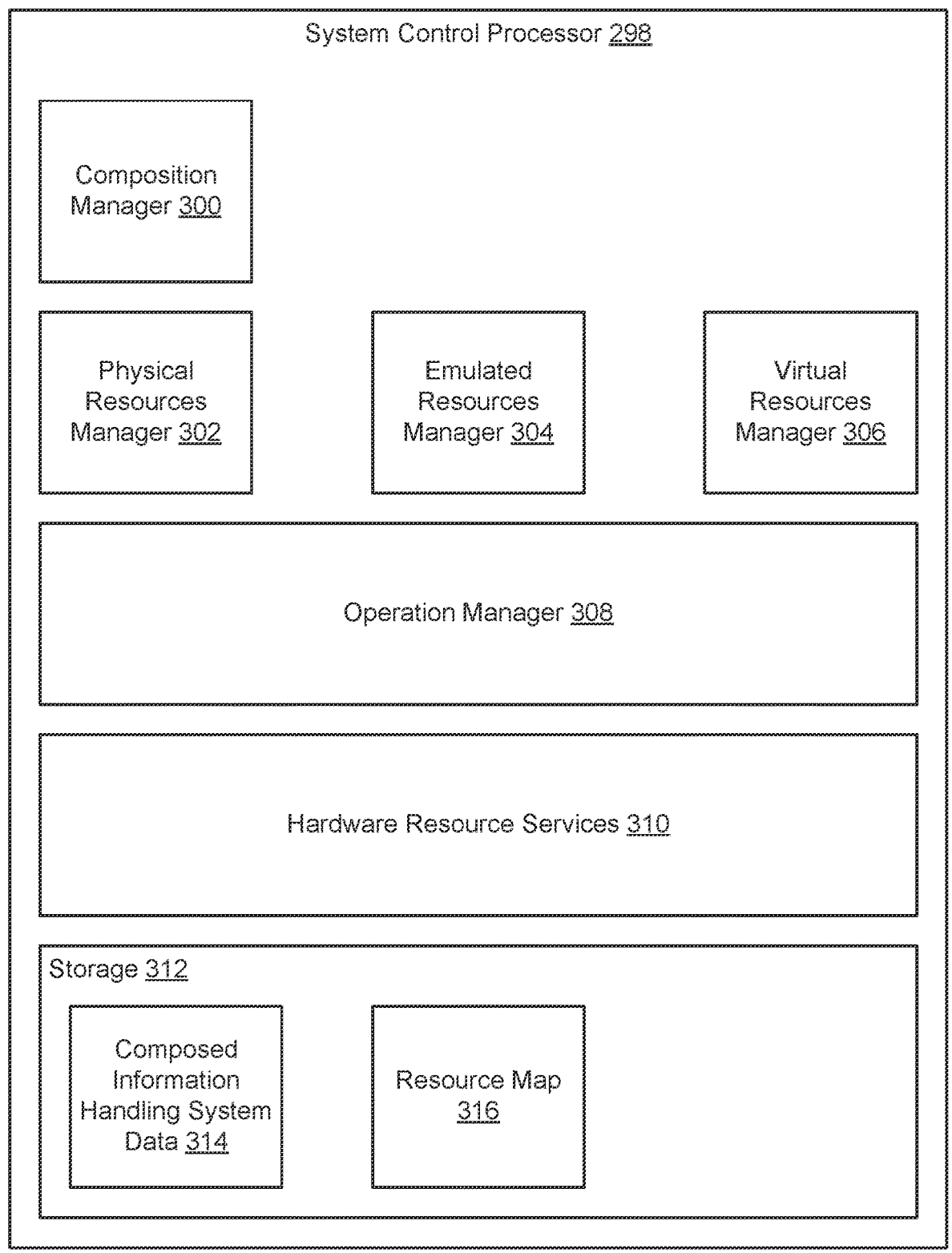
FIG. 3 shows a diagram of a system control processor in accordance with one or more embodiments of the invention.

For additional details regarding the operation and functions of the system control processors (114), refer to FIG. 3.

The compute resources interface (112) may be implemented using any suitable interconnection technology including, for example, system buses such as compute express links or other interconnection protocols. The compute resources interface (112) may support any input/output (IO) protocol, any memory protocol, any coherence interface, etc. The compute resources interface (112) may support processor to device connections, processor to memory connections, and/or other types of connections. The compute resources interface (112) may be implemented using one or more hardware devices including circuitry adapted to provide the functionality of the compute resources interface (112).

The hardware resources interface (116) may be implemented using any suitable interconnection technology including, for example, system buses such as compute express links or other interconnection protocols. The hardware resources interface (116) may support any input/output (IO) protocol, any memory protocol, any coherence interface, etc. The hardware resources interface (116) may support processor to device connections, processor to memory connections, and/or other types of connections. The hardware resources interface (116) may be implemented using one or more hardware devices including circuitry adapted to provide the functionality of the hardware resources interface (116).

In some embodiments of the invention, the compute resource set (102), control resource set (108), and/or hardware resource set (110) may be implemented as separate physical devices. In such a scenario, the compute resources interface (112) and hardware resources interface (116) may include one or more networks enabling these resource sets to communicate with one another. Consequently, any of these resource sets (e.g., 102, 108, 110) may include network interface cards or other devices to enable the hardware devices of the respective resource sets to communicate with each other.

In one or more embodiments of the invention, the system control processors (114) support multiple, independent connections. For example, the system control processors (114) may support a first network communications connection (e.g., an in-band connection) that may be allocated for use by applications hosted by the processors (106). The system control processors (114) may also support a second network communications connection (e.g., an out-of-band connection) that may be allocated for use by applications hosted by the system control processors (114). The out-of-band connection may be utilized for management and control purposes while the in-band connection may be utilized to provide computer implemented services. These connections may be associated with different network endpoints thereby enabling communications to be selectively directed toward applications hosted by the processors (106) and/or system control processors (114). As will be discussed in greater detail with respect to FIG. 3, the system control processors (114) may utilize the out-of-band connections to communicate with other devices to manage (e.g., instantiate, monitor, modify, etc.) composed information handling systems.

The network (130) may correspond to any type of network and may be operably connected to the Internet or other networks thereby enabling the information handling system (100) to communicate with any number and type of other devices.

The information handling system (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 5.1-5.3. The information handling system (100) may be implemented using other types of computing devices without departing from the invention. For additional details regarding computing devices, refer to FIG. 7.

While the information handling system (100) has been illustrated and described as including a limited number of specific components, an information handling system in accordance with embodiments of the invention may include additional, fewer, and/or different components without departing from the invention.

Turning to FIG. 2, FIG. 2 shows a diagram of the hardware resources (118) in accordance with one or more embodiments of the invention. As noted above, system control processors of information handling system may present resources including, for example, some of the hardware resources (118) to form a composed information handling system.

The hardware resources (118) may include any number and types of hardware devices that may provide any quantity and type of computing resources. For example, the hardware resources (118) may include storage devices (200), memory devices (202), and special purpose devices (204).

The storage devices (200) may provide storage resources (e.g., persistent storage) in which applications hosted by a composed information handling system may store data including any type and quantity of information. The storage devices (200) may include any type and quantity of devices for storing data. The devices may include, for example, hard disk drives, solid state drives, tape drives, etc. The storage devices (200) may include other types of devices for providing storage resources without departing from the invention. For example, the storage devices (200) may include controllers (e.g., redundant array of disk controllers), load balancers, and/or other types of devices.

The memory devices (202) may provide memory resources (e.g., transitory and/or persistent storage) in which a composed information handling system may store data including any type and quantity of information. The memory devices (202) may include any type and quantity of devices for storing data. The devices may include, for example, transitory memory such as random access memory, persistent memory such as enterprise class memory, etc. The memory devices (202) may include other types of devices for providing memory resources without departing from the invention. For example, the storage devices (200) may include controllers (e.g., replication managers), load balancers, and/or other types of devices.

The special purpose devices (204) may provide other types of computing resources (e.g., graphics processing resources, computation acceleration resources, etc.) to composed information handling systems. The special purpose devices (204) may include any type and quantity of devices for providing other types of computing resources. The special purpose devices (204) may include, for example, graphics processing units for providing graphics processing resources, compute accelerators for accelerating corresponding workloads performed by composed information handling systems, application specific integrated circuits (ASICs) for performing other functionalities, digital signal processors for facilitating high speed communications, etc. The special purpose devices (204) may include other types of devices for providing other types of computing resources without departing from the invention.

The system control processors of the information handling systems may mediate presentation of the computing resources provided by the hardware resources (118) to computing resource sets (e.g., as bare metal resources to processors). When doing so, the system control processors may provide a layer of abstraction that enables the hardware resources (118) to be, for example, virtualized, emulated as being compatible with other systems, and/or directly connected to the compute resource sets (e.g., pass through). Consequently, the computing resources of the hardware resources (118) may be finely, or at a macro level, allocated to different composed information handling systems.

Additionally, the system control processors may manage operation of these hardware devices in accordance with one or more models including, for example, data protection models, security models such as encrypting stored data, workload performance availability models such as implementing statistic characterization of workload performance, reporting models, etc. For example, the system control processors may instantiate redundant performance of workloads for high availability services.

The manner of operation of these devices may be transparent to the computing resource sets utilizing these hardware devices for providing computer implemented services. Consequently, even though the resulting composed information handling system control plane may be unaware of the implementation of these models, the composed information handling systems may still operate in accordance with these models thereby providing a unified method of managing the operation of composed information handling systems.

While the hardware resources (118) have been illustrated and described as including a limited number of specific components, hardware resources in accordance with embodiments of the invention may include additional, fewer, and/or different components without departing from the invention.

As discussed above, information handling systems may include system control processors that may be used to instantiate composed information handling systems. FIG. 3 shows a diagram of a system control processor (298) in accordance with one or more embodiments of the invention. Any of the system control processors included in control resources sets of FIG. 1.2 may be similar to the system control processor (298) illustrated in FIG. 3.

The system control processor (298) may facilitate instantiation and operation of composed information handling systems. By doing so, a system that includes information handling systems may dynamically instantiate composed information handling systems to provide computer implemented services.

To instantiate and operate composed information handling systems, the system control processor (298) may include a composition manager (300), a physical resources manager (302), an emulated resources manager (304), a virtual resources manager (306), an operation manager (308), hardware resource services (310), and storage (312). Each of these components of the system control processor is discussed below.

The composition manager (300) may manage the process of instantiating and operating composed information handling systems. To provide these management services, the composition manager (300) may include functionality to (i) obtain information regarding the hardware components of the information handling system (e.g., obtain telemetry data regarding the information handling system), (ii) provide the obtained information to other entities (e.g., management entities such as system control processor manager (50, FIG. 1.1)), (iii) obtain composition requests for composed information handling systems, (iv) based on the composition requests, prepare and present resources as bare metal resources to compute resource sets, (v) instantiate applications in composed information handling systems to cause the composed information handling systems to provide computer implemented services, conform their operation to security models, etc., (vi) manage the operation of the composed information handling systems by, for example, duplicating performance of workloads to improve the likelihood that the output of workloads are available, (vii) add/remove/modify resources presented to the compute resource sets of composed information handling systems dynamically in accordance with workloads being performed by the composed information handling systems, and/or (viii) coordinate with other system control processors to provide distributed system functionalities. By providing the above functionalities, a system control processor in accordance with one or more embodiments of the invention may enable distributed resources from any number of information handling systems to be aggregated into a composed information handling system to provide computer implemented services.

To obtain information regarding the hardware components of the information handling system, the composition manager (300) may inventory the components of the information handling system hosting the system control processor. The inventory may include, for example, the type and model of each hardware component, versions of firmware or other code executing on the hardware components, and/or information regarding hardware components of the information handling system that may be allocated to form composed information handling systems.

The composition manager (300) may obtain composition requests from other entities (e.g., management entities tasked with instantiating composed information handling systems), as pre-loaded instructions present in storage of the system control processor, and/or via other methods. The composition requests may specify, for example, the types and quantities of computing resources to be allocated to a composed information handling system.

In one or more embodiments of the invention, the composition requests specify the computing resource allocations using an intent based model. For example, rather than specifying specific hardware devices (or portions thereof) to be allocated to a particular compute resource set to obtain a composed information handling system, the resource requests may only specify that a composed information handling system is to be instantiated having predetermined characteristics, that a composed information handling system will perform certain workloads or execute certain applications, and/or that the composed information handling system be able to perform one or more predetermined functionalities. In such a scenario, the composition manager may decide how to instantiate the composed information handling system (e.g., which resources to allocate, how to allocate the resources (e.g., virtualization, emulation, redundant workload performance, data integrity models to employ, etc.), to which compute resource set(s) to present corresponding computing resources, etc.).

In one or more embodiments of the invention, the composition requests specify the computing resource allocations using an explicit model. For example, the composition requests may specify (i) the resources to be allocated, (ii) the manner of presentation of those resources (e.g., emulating a particular type of device using a virtualized resource vs. path through directly to a hardware component), and (iii) the compute resource set(s) to which each of the allocated resources are to be presented.

In addition to specifying resource allocations, the composition requests may also specify, for example, applications to be hosted by the composed information handling systems, security models to be employed by the composed information handling systems, communication models to be employed by the composed information handling systems, services to be provided to the composed information handling systems, user/entity access credentials for use of the composed information handling systems, and/or other information usable to place the composed information handling systems into states in which the composed information handling systems provide desired computer implemented services.

To prepare and present resources to compute resource sets based on the composition requests, the system control processors may implement, for example, abstraction, indirection, virtualization, mapping, emulation, and/or other types of services that may be used to present any type of resources as a resource that is capable of bare metal utilization by compute resource sets. To provide these services, the composition manager (300) may invoke the functionality of the physical resources manager (302), the emulated resources manager (304), and/or the virtual resources manager (306).

Additionally, the system control processors may take into account an importance of completion of workloads when preparing and presenting resources. For example, some workloads that may be performed by various hardware devices may be critical (e.g., high availability workloads) to the computer implemented services to be provided by a composed information handling system. In such a scenario, the system control processor may over allocate resources (e.g., beyond that requested by a compute resource set) for performance of the workloads so that at least two instances of the workloads can be performed using duplicative resources. By doing so, it may be more likely that at least one of the workloads will be completed successfully. Consequently, the system control processor may provide the output of one of the workloads to compute resource sets of a composed information handling system.

When presenting the resources to the compute resource sets, the system control processor (298) may present the resources using an emulated data plane. For example, the system control processors (298) may receive bare metal communications (e.g., IO from the processors) and respond in a manner consistent with responses of corresponding bare metal devices (e.g., memory). When doing so, the system control processor (298) may translate the communications into actions. The actions may be provided to the hardware devices used by the system control processor (298) to present the bare metal resources to the compute resource set(s). In turn, the hardware devices may perform the actions which results in a composed information handling system providing desired computer implemented services.

In some scenarios, multiple system control processors may cooperate to present bare metal resources to a compute resource set. For example, a single information handling system may not include sufficient hardware devices to present a quantity and/or type of resources to a compute resource set as specified by a composition request (e.g., present two storage devices to a compute resource set when a single information handling system only includes a single storage device). In this scenario, a second system control processor of a second information handling system operably connected to the system control processor tasked with presenting the resources to a compute resource set may prepare one of its storage devices for presentation. Once prepared, the second system control processor may communicate with the system control processor to enable the system control processor to present the prepared storage device (i.e., the storage device in the information handling system) to the compute resource set. By doing so, resources from multiple information handling systems may be aggregated to present a desired quantity of resources to compute resource set(s) to form a composed information handling system.

By forming composed information handling systems as discussed above, embodiments of the invention may provide a system that is able to effectively utilize distributed resources across a range of devices to provide computer implemented services.

The physical resources manager (302) may manage presentation of resources to compute resource sets. For example, the physical resources manager (302) may generate, for example, translation tables that specify actions to be performed in response to bare metal communications obtained from compute resource sets. The translation tables may be used to take action in response to communications from compute resource sets.

The physical resources manager (302) may generate the translation tables based on the components of the compute resource sets, allocations or other types of commands/communications obtained from the compute resource sets, and the resources of the information handling system allocated to service the compute resource set. For example, when a compute resource set is presented with a bare metal resource, it may go through a discovery process to prepare the bare metal resource for use. As the discovery process proceeds, the compute resource set may send commands/communications to the bare metal resource to, for example, discover its address range. The physical resources manager (302) may monitor this process, respond appropriately, and generate the translation table based on these commands and the resources available to service these bare metal commands/communications.

For example, consider a scenario where a virtualized disk is allocated to service bare metal storage commands from a compute resource set. In such a scenario, the physical resources manager (302) may generate a translation table that translates physical write from the compute resource set to virtualized writes corresponding to the virtualized disk. Consequently, the virtualized disk may be used by the system control processor (298) to present bare metal resources to the compute resource set.

The emulated resources manager (304) may generate emulation tables that enable resources that would otherwise be incompatible with a compute resource set to be compatible with the compute resource set. Different types of hardware devices of a compute resource set may be compatible with different types of hardware devices. Consequently, resources allocated to provide bare metal resources may not necessarily be compatible with the hardware devices of a compute resource set. The emulated resources manager (304) may generate emulation tables that map bare metal communications obtained from a compute resource set to actions that are compatible with resources allocated to provide bare metal resources to the compute resource sets.

The virtual resources manager (306) may manage virtualized resources that may be allocated to provide bare metal resources to compute resource sets. For example, the virtual resources manager (306) may include hypervisor functionality to virtualized hardware resources and allocate portions of the virtualized resources for use in providing bare metal resources.

While the physical resources manager (302), emulated resources manager (304), and virtual resources manager (306) have been described as generating tables, these components of the system control processor may generate other types of data structures or utilize different management models to provide their respective functionalities without departing from the invention.

The functionalities of the physical resources manager (302), emulated resources manager (304), and virtual resources manager (306) may be utilized in isolation and/or combination to provide bare metal resources to compute resource sets. By doing so, the system control processor (298) may address compatibility issues, sizing issues to match available resources to those that are to be allocated, and/or other issues to enable bare metal resources to be presented to compute resource sets.

When providing bare metal resources, the composition manager (300) may invoke the functionality of the physical resources manager (302), emulated resources manager (304), and virtual resources manager (306). Consequently, resources may be presented as bare metal resources via pass-through (i.e., forwarding TO from compute resource sets to hardware devices), bare metal resource addressing of virtualized resources, and/or as emulated resources compatible with the hardware components of the compute resource set.

The functionality of the physical resources manager (302), emulated resources manager (304), and virtual resources manager (306) may be invoked using any communication model including, for example, message passing, state sharing, memory sharing, etc.

The operation manager (308) may manage the general operation of the system control processor (298). For example, the operation manager (308) may operate as an operating system or other entity that manages the resources of the system control processor (298). The composition manager (300), physical resources manager (302), emulated resources manager (304), virtual resources manager (306), and/or other entities hosted by the system control processor (298) may call or otherwise utilize the operation manager (308) to obtain appropriate resources (e.g., processing resources, memory resources, storage, communications, etc.) to provide their functionalities.

The hardware resource services (310) may facilitate use of the hardware components of any number of hardware resource sets (e.g., 110, FIG. 1.1). For example, the hardware resource services (310) may include driver functionality to appropriately communicate with the hardware devices of hardware resource sets. The hardware resource services (310) may be invoked by, for example, the operation manager (308).

When providing their functionalities, any of the aforementioned components of the system control processor (298) may perform all, or a portion, of the methods illustrated in FIGS. 5.1-5.3.

The system control processor (298) may be implemented using computing devices. The computing devices may be, for example, an embedded computing device such a system on a chip, a processing device operably coupled to memory and storage, or another type of computing device. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor (298) described in this application and/or all, or a portion, of the methods illustrated in FIGS. 5.1-5.3. The system control processor (298) may be implemented using other types of computing devices without departing from the invention. For additional details regarding computing devices, refer to FIG. 7.

In one or more embodiments of the invention, the system control processor (298) is implemented as an on-board device. For example, the system control processor (298) may be implemented using a chip including circuitry disposed on a circuit card. The circuit card may also host the compute resource sets and/or hardware resource sets managed by the system control processor (298).

In one or more embodiments of the invention, the composition manager (300), physical resources manager (302), emulated resources manager (304), virtual resources manager (306), operation manager (308), and/or hardware resource services (310) are implemented using a hardware device including circuitry. The hardware device may be, for example, a digital signal processor, a field programmable gate array, or an application specific integrated circuit. The circuitry may be adapted to cause the hardware device to perform the functionality of the composition manager (300), physical resources manager (302), emulated resources manager (304), virtual resources manager (306), operation manager (308), and/or hardware resource services (310). The composition manager (300), physical resources manager (302), emulated resources manager (304), virtual resources manager (306), operation manager (308), and/or hardware resource services (310) may be implemented using other types of hardware devices without departing from the invention.

In one or more embodiments of the invention, the composition manager (300), physical resources manager (302), emulated resources manager (304), virtual resources manager (306), operation manager (308), and/or hardware resource services (310) are implemented using a processor adapted to execute computing code stored on a persistent storage (e.g., as part of the system control processor (298) or operably connected to the system control processor (298) thereby enabling processors of the system control processor (298) to obtain and execute the computing code) that when executed by the processor performs the functionality of the composition manager (300), physical resources manager (302), emulated resources manager (304), virtual resources manager (306), operation manager (308), and/or hardware resource services (310). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (312) is implemented using physical devices that provide data storage services (e.g., storing data and providing copies of previously stored data). The devices that provide data storage services may include hardware devices and/or logical devices. For example, storage (312) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (312) may include a memory device (e.g., a dual in line memory device) in which data is stored and from which copies of previously stored data are provided. In another example, storage (312) may include a persistent storage device (e.g., a solid-state disk drive) in which data is stored and from which copies of previously stored data is provided. In a still further example, storage (312) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (312) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (312) may store data structures including, for example, composed information handling system data (314) and a resource map (316). Each of these data structures is discussed below.

The composed information handling system data (314) may be implemented using one or more data structures that includes information regarding composed information handling systems. For example, the composed information handling system data (314) may specify identifiers of composed information handling systems and resources that have been allocated to the composed information handling systems.

The composed information handling system data (314) may also include information regarding the operation of the composed information handling systems. The information may include, for example, workload performance data, resource utilization rates over time, and/or other information that may be utilized to manage the operation of the composed information handling systems.

The composed information handling system data (314) may further include information regarding management models employed by system control processors. For example, the composed information handling system data (314) may include information regarding duplicative data stored for data integrity purposes, redundantly performed workloads to meet high availability service requirements, encryption schemes utilized to prevent unauthorized access of data, etc.

The composed information handling system data (314) may be maintained by, for example, the composition manager (300). For example, the composition manager may add, remove, and/or modify information included in the composed information handling system data (314) to cause the information included in the composed information handling system data (314) to reflect the state of the composed information handling systems.

The data structures of the composed information handling system data (314) may be implemented using, for example, lists, tables, unstructured data, databases, etc. While illustrated in FIG. 3 as being stored locally, the composed information handling system data (314) may be stored remotely and may be distributed across any number of devices without departing from the invention.

The resource map (316) may be implemented using one or more data structures that include information regarding resources of the information handling system and/or other information handling systems. For example, the resource map (316) may specify the type and/or quantity of resources (e.g., hardware devices, virtualized devices, etc.) available for allocation and/or that are already allocated to composed information handling systems. The resource map (316) may be used to provide data to management entities such as system control processor managers.

The data structures of the resource map (316) may be implemented using, for example, lists, tables, unstructured data, databases, etc. While illustrated in FIG. 3 as being stored locally, the resource map (316) may be stored remotely and may be distributed across any number of devices without departing from the invention.

The resource map (316) may be maintained by, for example, the composition manager (300). For example, the composition manager (300) may add, remove, and/or modify information included in the resource map (316) to cause the information included in the resource map (316) to reflect the state of the information handling system and/or other information handling systems.

While the storage (312) has been illustrated and described as including a limited number and type of data, a storage in accordance with embodiments of the invention may store additional, less, and/or different data without departing from the invention.

While the system control processor (298) has been illustrated and described as including a limited number of specific components, a system control processor in accordance with embodiments of the invention may include additional, fewer, and/or different components without departing from the invention.

Figure 4:
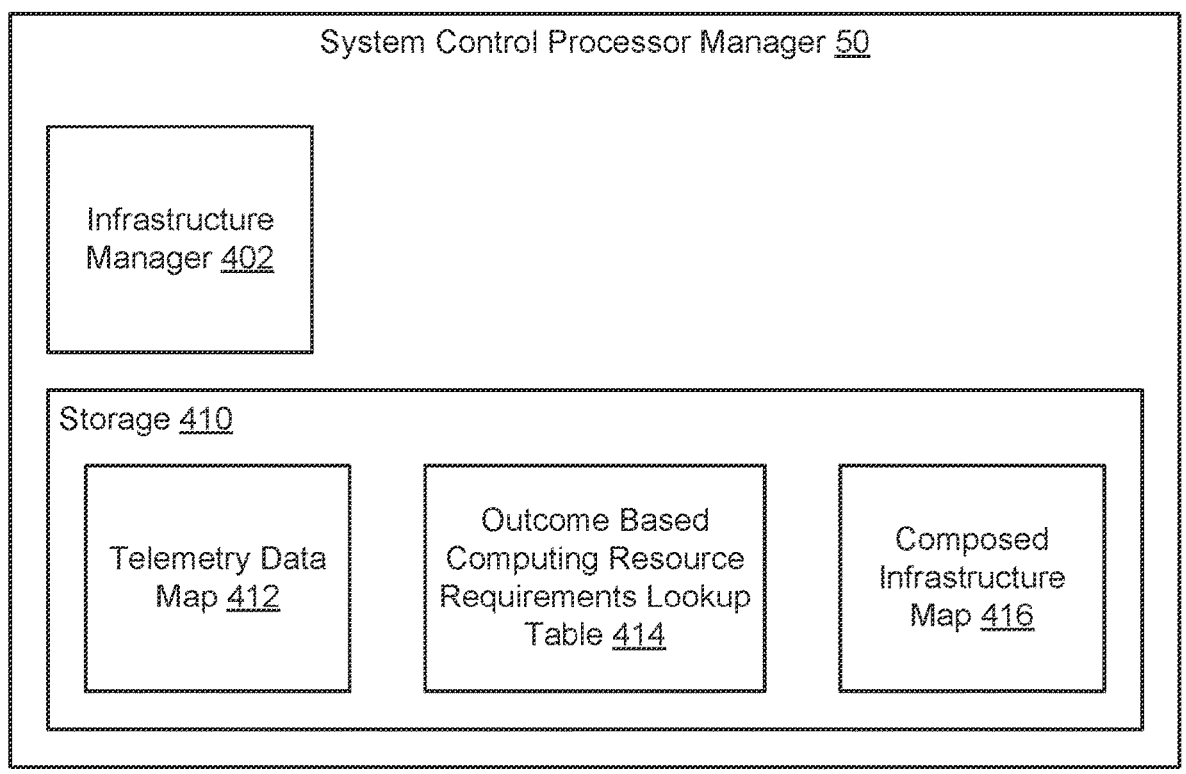
FIG. 4 shows a diagram of a system control processor manager in accordance with one or more embodiments of the invention.

As discussed above, a system control processor manager may cooperate with system control processors of control resource sets to instantiate composed information handling systems by presenting computing resources from hardware resource sets to processors of compute resource sets. FIG. 4 shows a diagram of the system control processor manager (50) in accordance with one or more embodiments of the invention.

The system control processor manager (50) may manage the process of instantiating composed information handling systems. To do so, the system control processor manager (50) may include an infrastructure manager (402) and storage (410). Each of these components is discussed below.

The infrastructure manager (402) may provide composition services. Composition services may include obtaining composition requests for composed information handling systems, determining the resources to allocate to instantiate composed information handling systems, and cooperating with system control processors to allocate the identified resources. By doing so, the infrastructure manager (402) may cause any number of computer implemented services to be provided using the composed information handling systems.

To determine the resources to allocate to composed information handling systems, the infrastructure manager (402) may employ an intent based model that translates an intent expressed in a composition request to one more allocations of computing resources. For example, the infrastructure manager (402) may utilize an outcome based computing resource requirements lookup table (414) to match an expressed intent to resources to be allocated to satisfy that intent. The outcome based computing resource requirements lookup table (414) may specify the type, quantity, method of management, and/or other information regarding any number of computing resources that when aggregated will be able to satisfy a corresponding intent. The infrastructure manager (402) may identify resources for allocation to satisfy composition requests via other methods without departing from the invention.

To cooperate with the system control processors, the infrastructure manager (402) may obtain telemetry data regarding the computing resources of any number of information handling systems and/or external resources that are available for allocation. The infrastructure manager (402) may aggregate this data in a telemetry data map (412) which may be subsequently used to identify resources of any number of information handling systems and/or external resources to satisfy composition requests (e.g., instantiate one or more composed information handling systems to meet the requirements of the composition requests).

When the infrastructure manager (402) identifies the computing resources to be allocated, the infrastructure manager (402) may communicate with any number of system control processors to implement the identified allocations. For example, the infrastructure manager (402) may notify a system control processor of a control resource set that portions of a hardware resource set are to be allocated to a compute resource set to instantiate a composed information handling system. The system control processor may then take action (e.g., prepare the portion of the hardware resource set for presentation to a processor of the compute resource set) in response to the notification.

As composed information handling systems are instantiated, the infrastructure manager (402) may add information reflecting the resources allocated to composed information handling systems, the workloads being performed by the composed information handling systems, and/or other types of information to a composed infrastructure map (416). The infrastructure manager (402) may utilize this information to, for example, decide whether computing resources should be added to or removed from composed information handling systems. Consequently, computing resources may be dynamically re-provisioned over to meet changing workloads imposed on composed information handling systems.

In one or more embodiments of the invention, the infrastructure manager (402) is implemented using a hardware device including circuitry. The hardware device may be, for example, a digital signal processor, a field programmable gate array, or an application specific integrated circuit. The circuitry may be adapted to cause the hardware device to perform the functionality of the infrastructure manager (402). The infrastructure manager (402) may be implemented using other types of hardware devices without departing from the invention.

In one or more embodiments of the invention, the infrastructure manager (402) is implemented using a processor adapted to execute computing code stored on a persistent storage that when executed by the processor performs the functionality of the infrastructure manager (402). The processor may be a hardware processor including circuitry such as, for example, a central processing unit or a microcontroller. The processor may be other types of hardware devices for processing digital information without departing from the invention.

When providing its functionality, the infrastructure manager (402) may perform all, or a portion, of the methods illustrated in FIGS. 5.1-5.3.

In one or more embodiments disclosed herein, the storage (410) is implemented using physical devices that provide data storage services (e.g., storing data and providing copies of previously stored data). The devices that provide data storage services may include hardware devices and/or logical devices. For example, storage (410) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (410) may include a memory device (e.g., a dual in line memory device) in which data is stored and from which copies of previously stored data are provided. In another example, storage (410) may include a persistent storage device (e.g., a solid-state disk drive) in which data is stored and from which copies of previously stored data is provided. In a still further example, storage (410) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (410) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or another hardware device that allocates the storage resources of the physical storage devices.

The storage (410) may store data structures including, for example, the telemetry data map (412), outcome based computing resource requirements lookup table (414), and the composed infrastructure map (416). These data structures may be maintained by, for example, the infrastructure manager (402). For example, the infrastructure manager (402) may add, remove, and/or modify information included in these data structures to cause the information included in these data structures to reflect the state of any number of information handling systems, external resources, and/or composed information handling systems.

Any of these data structures may be implemented using, for example, lists, tables, unstructured data, databases, etc. While illustrated in FIG. 4 as being stored locally, any of these data structures may be stored remotely and may be distributed across any number of devices without departing from the invention.

While the storage (410) has been illustrated and described as including a limited number and type of data, a storage in accordance with embodiments of the invention may store additional, less, and/or different data without departing from the invention.

While the system control processor manager (50) has been illustrated and described as including a limited number of specific components, a system control processor manager in accordance with embodiments of the invention may include additional, fewer, and/or different components than those illustrated in FIG. 4 without departing from the invention.

As discussed above, the system of FIG. 1.1 may provide computer implemented services using composed information handling systems. FIGS. 5.1-5.2 show methods that may be performed by components of the system of FIG. 1.1 to manage composed information handling systems.

FIG. 5.1 shows a flowchart of a method in accordance with one or more embodiments of the invention. The method depicted in FIG. 5.1 may be performed to provide computer implemented services using a composed information handling system in accordance with one or more embodiments of the invention. The method shown in FIG. 5.1 may be performed by, for example, a system control processor manager (e.g., 50, FIG. 1.1). Other components of the system in FIG. 1.1 may perform all, or a portion, of the method of FIG. 5.1 without departing from the invention.

While FIG. 5.1 is illustrated as a series of steps, any of the steps may be omitted, performed in a different order, additional steps may be included, and/or any or all of the steps may be performed in a parallel and/or partially overlapping manner without departing from the invention.

In step 500, a composition request for a composed information handling system is obtained. The composition request may be obtained using any method without departing from the invention. For example, the composition request may be obtained as part of a message from another entity operably connected to a system control processor manager. In another example, the composition request may be locally stored in a storage of a system control processor manager.

The composition request may be a data structure specifying that the composed information handling system is to be instantiated. As discussed with respect to FIG. 3, the composition request may be specific (i.e., includes a listing of resources to be allocated to the composed information handling system) or intent based (i.e., a desired outcome without specifying the resources to be allocated). The composition request may include any type and quantity of information usable to determine how to instantiate a composed information handling system.

In one or more embodiments of the invention, the composition request includes a list of computing resources to be allocated to the composed information handling system. For example, the composition request may specify computing resources, memory resources, storage resources, graphics processing resources, compute acceleration resources, communications resources, etc. The list may include any type and quantity of computing resources.

In one or more embodiments of the invention, the composition request specifies how the computing resources are to be presented. For example, the composition request may specify virtualization, emulation, etc. for presenting the computing resources.

In one or more embodiments of the invention, the composition request specifies how the resources used to present the computing resources are to be managed (e.g., a management model such as data integrity, security, management, usability, performance, etc.). For example, the composition request may specify levels of redundancy for data storage, data integrity to be employed (e.g., redundant array of independent disks (RAID), error correction code (ECC), etc.), levels of security to be employed for resources (e.g., encryption), and/or other information that specifies how system control processors are to utilize its resources for presentation of resources to composed information handling systems. The methods employed by the system control processors may be transparent to the composed information handling systems because the resources may be presented to the compute resource sets of the composed information handling systems as bare metal resources while the system control processors provide the management functionality.

In one or more embodiments of the invention, the composition request includes a list of applications to be hosted by the composed information handling system. The list may include any type and quantity of applications.

The composition request may also specify the identities of one or more system control processors hosted by other devices. In some scenarios, as noted above, resources from other information handling systems may be used to form a composed information handling system. The identifiers of the system control processors of these other information handling systems may be used to form operable connections between the system control processors. These connections may be used by the system control processors to present, as bare metal resources, computing resources from other information handling systems to compute resource set(s) of the composed information handling system.

In one or more embodiments of the invention, the composition request specifies a desired outcome. The desired outcome may be, for example, computer implemented services to be provided in response to the composition request. In another example, the desired outcome may be a list of applications to be hosted in response to the composition request. In other words, the composition request may specify a desired outcome without specifying the resources that are to be used to satisfy the requests, the methods of managing the resources, and/or models employed to provide for data integrity/security/etc. Such a composition request may be referred to as an intent based composition request.

In step 502, it is determined whether the composition request is an intent based request. If the composition is an intent based request, the method may proceed to step 520 of FIG. 5.2. If the composition is not an intent based request, then the method may proceed to step 504.

In step 504, at least one compute resource set having computing resources specified by the composition request is identified. The at least one compute resource set may be identified by matching the computing resources specified by the composition request to at least one compute resource set having those resources using a telemetry data map (see e.g., 412, FIG. 4).

For example, the telemetry data map (see e.g., 412, FIG. 4) may specify a list of compute resource sets, identifiers of control resource sets that manage the listed compute resource sets, and/or the hardware devices of the listed compute resource sets. By matching the computing resources specified by the composition request to the hardware devices specified in the list, the compute resource set corresponding to the listed hardware devices may be identified as the at least one compute resource set.

If no compute resource set includes all of the computing resources specified by the composition request, multiple compute resource sets having sufficient hardware devices to meet the computing resources specified by the composition request may be identified as the at least one compute resource set.

In step 506, at least one hardware resource set having hardware resources specified by the composition request is identified. The at least one hardware resource set may be identified similarly to that described with respect to the identified of the at least one compute resource set of step 504. For example, the computing resources requirements specified by the composition request may be matched to compute resource sets.

The at least one hardware resource may also be identified via the method illustrated in FIG. 5.3.

In step 508, management services for the hardware resources are setup using at least one control resource set to obtain logical hardware resources managed by the at least one control resource set. The management services may include, for example, virtualization, emulation, abstraction, indirection, and/or other type of services to meet the requirements of data integrity, security, and/or management models. The control resource set may provide management services to the at least one hardware resource set identified in step 506.

To setup the management services, the system control processor manager may cooperate with the at least one control resource set. For example, the system control processor manager may generate instructions for implementing the management services, encapsulate the instructions in a message, and send the message to one or more system control processors of the at least one control resource set. In response to receiving the message, the system control processors may implement the instructions thereby implementing any number of management services such as virtualization, emulation, etc.

The system control processor manager may also include identification information for the system control processors that will cooperate in presenting resources as part of instantiating a composed information handling system. Consequently, the system control processors of the control resource sets that will facilitate bare metal presentation of resources to processors of compute resource sets of the composed information handling system may be able to identify each other, communicate with one another, etc.

Setting up management services for the hardware resource set may include, for example, preparing translation, indirection, or abstraction tables used to translate logical addresses provided by compute resource sets to physical addresses utilized by hardware devices of the hardware resource set.

In another example, setting up management services may include, if the type of the resource allocation is a portion of a virtualized resource, making a call to a virtualization resources manager to allocate the portion of resources from an existing virtualized resource or by instantiating a new virtualized resource and allocating the portion from the new virtualized resource.

In a still further example, if the type of the resource allocation requires an emulated resource, providing management services may include instantiating a corresponding emulation layer between a hardware device of the hardware resource set and the compute resource set. Consequently, bare metal communications between the compute resource set and the hardware device used to present the bare metal resource to the compute resource set may be automatically translated by the system control processor.

Setting up management services may further include modifying the operation of one or more devices to provide, for example, data integrity functionality (e.g., RAID, ECC, etc.), security functionality (e.g., encryption), and/or other functionalities that are transparent to the composed information handling system.

In step 510, the logical hardware resources are presented to the at least one compute resource set as bare metal resources using the at least one control resource set to instantiate the composed information handling system to service the composition request.

To present the logical hardware resources, the system control processor manager may instruct the system control processors of the at least control resource set to make the bare metal resources discoverable. For example, the at least one control resource set may send a bare metal communication to one or more processors of the at least one compute resource set to cause the processors to discover the presence of the presented bare metal resources. By doing so, the processors may then begin to utilize the logical hardware resources as bare metal resources resulting in a composed information handling system having all of the resources necessary to provide desired computer implemented services.

The method may end following step 510.

Using the method illustrated in FIG. 5.1, a composed information handling system may be formed using computing resources from one or more information handling systems and/or external resources may be obtained.

Turning to FIG. 5.2, FIG. 5.2 shows a continuation of the flowchart of FIG. 5.1.

As discussed with respect to FIG. 5.1, the method illustrated in FIG. 5.1 may proceed to step 520 of FIG. 5.2 if the composition request is an intent based request.

In step 520, an application specified by the composition request is matched to compute resource requirements for the application. As discussed with respect to FIG. 4, a system control processor manager may store an outcome based computing resource requirements lookup table (e.g., 414, FIG. 4). This table may associate different applications with computing resource requirements for that application to be successfully implemented.

For example, the outcome based computing resource requirements lookup table may include a list of different applications and the corresponding computing resources that have been heuristically determined to be needed to be available for the listed application to provide their services. The listings may specify the computing resources granularly (e.g., makes, quantities, and types of devices) or generally (e.g., a quantity of each type of computing resource).

By matching the application to the compute resource requirements for the application, the system control processor manager may identify the resources that are to be allocated to the composed information handling system. If the composition request specifies multiple applications, then step 520 may be repeated and the corresponding computing resource requirements may be aggregated to identify the aggregate computing resources for the composed information handling system.

In step 522, at least one compute resource set having resources meeting the computing resource requirements of the identified computing resource requirements is identified. The at least one compute resource set may be identified as described with respect to step 504 of FIG. 5.1 but utilizes the identified computing resource requirements of step 520.

In step 524, at least one hardware resource set having resources meeting the computing resource requirements identified in step 520 is identified. The at least one hardware resource set may be identified as described with respect to step 506 of FIG. 5.1 but utilizes the identified computing resource requirements of step 520.

In step 526, management services for the hardware resource set are setup using at least one control resource set to obtain logical hardware resources. The management services may be setup in a manner that is similar to that described with respect to step 508 of FIG. 5.1.

In step 528, the logical hardware resources are presented to the at least one compute resource set as bare metal resources using the control resource set to instantiate a composed information handling system to service the composition request. The logical hardware resources may be presented similarly to that described with respect to step 510 of FIG. 5.1.

The method may end following step 528.

Using the method illustrated in FIG. 5.2, intent based composition requests may be services to obtain composed information handling systems capable of providing computer implemented services as specified by the intent based composition requests.

Following steps 510 and 528 of FIGS. 5.1, and 5.2, respectively, no applications may be presently executing on the composed information handling system. The composed information handling systems may then be turned over to other entities for management (e.g., orchestrators) or may be additionally managed by the system control processor manager by instructing the system control processors to load applications onto the composed information handling systems using any method without departing from the invention. For example, device images (e.g., data structures including information that may be used to instantiate one or more applications in corresponding operating states) may be used to begin execution of appropriate applications in desired states. By doing so, the composed information handling systems may begin to provide desired computer implemented services. Applications may be instantiated on a composed information handling system using other methods (e.g., performing first-time installations, copying binaries to storage and beginning execution of the binaries, etc.) without departing from the invention.

Concurrently with or following the steps illustrated in FIGS. 5.1-5.2, the composed information handling system data (314, FIG. 3) and resource map (316, FIG. 3) may be updated to reflect that various resources have now been allocated and are no longer available for allocation. For example, the resource map (316, FIG. 3) may be updated to indicate that the various hardware/virtualized devices being utilized to present bare metal resources to the composed information handling system are now allocated and unavailable (at least in part if virtualized) for allocation to present bare metal resources to other composed information handling systems. The resource maps maintained by the system control processor manager may be similarly updated.

Turning to FIG. 5.3, this figure shows a flowchart of a method in accordance with one or more embodiments of the invention. The method depicted in FIG. 5.3 may be performed to allocate resources for a composed information handling system in accordance with one or more embodiments of the invention. The method shown in FIG. 5.3 may be performed by, for example, a system control processor manager (e.g., 50, FIG. 1.1). Other components of the system in FIG. 1.1 may perform all, or a portion, of the method of FIG. 5.3 without departing from the invention.

While FIG. 5.3 is illustrated as a series of steps, any of the steps may be omitted, performed in a different order, additional steps may be included, and/or any or all of the steps may be performed in a parallel and/or partially overlapping manner without departing from the invention.

Prior to step 540, a system control processor manager may have obtained a composition request. The composition request may indicate that a predetermined type of workload will be performed by the composed information handling system. For example, the composition request may specify an intent of a service to be provided by the composed information handling system. To provide that service, a corresponding workload may need to be performed. In another example, the composition request may specify one or more applications to be hosted by the composed information handling systems. These applications may perform corresponding workloads.

In step 540, a workload type that will be performed is identified based on the composition request. The workload type may be identified: (i) using information included in the composition request, (ii) heuristically determined information (e.g., relationships between applications/intent and corresponding workloads that will be performed), determined using any other method or type(s) of information, and/or using any combination thereof.

In step 542, it is determined whether redundancy is required based on the workload type. Redundancy may be required when an importance of the workload is above a predetermined threshold such that additional computing resources will be allocated to a composed information handling system so that the composed information handling system can perform multiple copies of the workload in parallel when only a single copy of the workload is requested to be executed by control plane entities of the composed information handling system. By doing so, it may be more likely that at least one copy of the workload will be successfully completed.

To make this determination, the system control processor may compare the identified workload type to a list of workload types that qualify for over allocation of computing resources for redundant workload performance purposes. If the workload type is included in the list, it may be determined that redundancy for the workload is required. If it is determined that redundancy for the workload is required, the method may proceed to step 544. If redundancy for the workload is not required, the method may proceed to step 546.

In step 544, redundant hardware resources are allocated for redundant performance of the workload type. The redundant hardware resources may be allocated by determining an allocation of computing resources required for the number of instances of the workload type that will be requested to be performed by control plane entities of a composed information handling system. The system control processor manager may determine an additional allocation of computing resources that enable the number of instances of the workload type to be duplicative performed.

The system control processor manager may allocate, for the composed information handling system, a quantity of computing resources corresponding to the sum of the allocation of the computing resources and the additional computing resources allocation. In other words, a sufficient quantity of computing resources to service the workload types and perform additional copies of the workload types.

The system control processor manager may then identify hardware resources of hardware resource sets of any number of information handling systems that will provide the aggregate computing resources as the redundant hardware resources.

To allocate the redundant hardware resources, one or more messages may be sent to the system control processors of the corresponding information handling systems (e.g., those information handling systems that include the identified hardware resource sets). The message may indicate that corresponding hardware resources of the hardware resource sets are to be allocated to the composed information handling system. The hardware resources may be allocated as a part of steps 506, 508, 510, 524, 526, and 528 of FIGS. 5.1 and 5.2. For example, the method of FIG. 5.3 may be performed as part of identifying, setting up management services, and connecting hardware resource sets.

The one or more messages may also indicate that when a request from a control plane entity (e.g., via a bare metal communication from a processor to a system control processor) is received that indicates that a workload of the workload type is to be performed, the system control processor should instantiate redundant copies of the workload beyond that requested by the control plane entity. For example, when a request for performance of an instance of a workload on a graphics processing unit is received, the system control processor may initiate a first copy of the workload on a first graphics processing unit and a second copy of the workload on a second graphics processing unit. This duplicate performance of the workload may be unknown to the control plane entity.

When the redundant workloads are completed, the system control processor may utilize the outputs of the workloads to determine whether the workloads were performed correctly and service the workload performance request from the control plane entity. For example, the system control processor may compare the outputs of the workloads to determine if they are the same or different. If the output is the same, the system control processor may determine that both instances of the workload completed successfully and may provide one copy of either output to satisfy the request from the control plane entity.

If the outputs of the workloads are different, the system control processor may determined that one of the workloads was not performed correctly. The system control processor may obtain health information from the hardware resources used to perform the workloads to ascertain which of the outputs, if any, completed correctly. Based on the health information, the system control processor may provide one of the outputs to service the workload request if the health information indicates that either of the workloads completed successfully.

If the system control processor identifies that one of the duplicate hardware resources did not perform the workload correctly, the system control processor may suspend performance of workloads using those hardware resources, notify a system control processor manager that some of its hardware resources have failed, and request that the failed hardware resources be replaced. The system control processor manager may take action to replace the hardware resources which are indicated by the system control processor to have failed. For example, the system control processor manager may identify unallocated hardware resources corresponding to the failed hardware resources, instruct a corresponding system control processor to allocate the identified hardware resources to the composed information handling system, and manage deallocation of the failed hardware resources from the composed information handling system.

The method may end following step 544.

Returning to step 542, the method may proceed to step 546 following step 542 if it is determined that redundancy is not required.

In step 546, hardware resources for non-redundant performance of the workload type are allocated. A similar process may be performed as described with respect to step 544 to allocate the hardware resources for non-redundant performance of the workload type. However, the additional hardware resources discussed with respect to step 544 may not be allocated. Consequently, the resulting composed information handling system may only have sufficient hardware resources to perform the number of workloads of the workload type requested to be performed by control plane entity of the composed information handling system (in contrast to a composed information handling system instantiated via step 544 which allocates additional hardware resources so that more than the requested number of instances of the workloads are able to be performed).

The method may end following step 546.

Using the method illustrated in FIG. 5.3, hardware resources may be allocated to a composed information handling system. The allocated hardware resources may enable requested workloads to be redundantly performed. Consequently, if one of the redundantly performed workloads does not complete successfully, the output of another of the redundant workloads that completed successfully may be used to provide appropriate output to satisfy a workload request.

The redundant hardware resources allocated for performance of workloads may include, for example, graphics processing units, storage devices, memory devices, special purpose hardware device such as application specific integrated circuits, and/or other types of hardware devices that may be included in one or more hardware resource sets of information handling systems.

To further clarify embodiments of the invention, a non-limiting example is provided in FIGS. 6.1-6.5. FIGS. 6.1 and 6.4 show a system similar to that illustrated in FIG. 1.1. Actions performed by components of the illustrated system are illustrated by numbered, circular boxes interconnected, in part, using dashed lines. For the sake of brevity, only a limited number of components of the system of FIG. 1.1 is illustrated in FIGS. 6.1 and 6.4. FIGS. 6.2-6.3 show diagrams of examples of data structures utilized by the example system of FIGS. 6.1 and 6.4. FIG. 6.5 shows a relationship diagram indicating relationships that may exist within the system of FIGS. 6.1 and 6.4.

EXAMPLE

Consider a scenario as illustrated in FIG. 6.1 in which a client (602), at step 1, sends a composition request to a system control processor manager (600) that manages two information handling systems (610, 620). The composition request specifies that a composed information handling system is to be instantiated to perform a virtual reality workload.

In response to the composition request, the system control processor manager (600), at step 2, identifies computing resources to be allocated to the composed information handling system using the table illustrated in FIG. 6.3. As seen in FIG. 6.3, the outcome based computing resource requirements lookup table (660) includes an entry (e.g., 662) associated with hosting of a data base application and a second entry (e.g., 670) associated with hosting a virtual reality application.

The virtual reality application entry (670) is used by the system control processor manager (600) to ascertain the computing resource requirements for the composed information handling system. For example, the virtual reality application entry (670) specifies that a compute resource set (672), control resource set (674) and hardware resource set (676) need to be allocated to the composed information handling system to have the composed information handling system be capable of performed the workload associated with a virtual reality application. The compute resource set (672) specified by the entry includes one processor and two gigabytes of memory, the control resource set (674) includes error correction code protection for stored data, and the hardware resource set (676) includes one terabyte of solid state disk space and a graphic processing unit. Using the information included in the virtual reality application entry (670), the system control processor manager (600) identifies corresponding compute, control, and hardware resource sets for allocation to the composed information handling system using a telemetry data map (640) as illustrated in FIG. 6.2.

As seen in FIG. 6.2, the telemetry data map (640) includes entries (642, 652) that specify the resources sets and corresponding hardware devices of these resource sets of the information handling systems (e.g., 610, 620, FIG. 6.1). For example, the telemetry data map (640) includes a first entry (642) associated with information handling system A (610, FIG. 6.1), which specifies that information handling system A includes a compute resource set (644) that includes a processor and memory, a control resource set (648) that includes a system control processor, and a hardware resource set (650) that includes a graphics processing unit. Similarly, the telemetry data map (640) includes a second entry (652) associated with information handling system B (620, FIG. 6.1), which specifies that information handling system B includes a compute resource set (654) that includes a processor and memory, a control resource set (656) that includes a system control processor, and a hardware resource set (658) that includes a solid state disk having four terabytes of storage space.

Returning to FIG. 6.1, based on the information included in the tables illustrated in FIGS. 6.2 and 6.3, the system control processor manager (600), at step 3, determines that a composed information handling system should be instantiated utilizing compute resource set A (612), system control processor (614), and graphics processing unit (616) of information handling system A (610). Additionally, to meet the storage space required for the virtual reality application, the system control processor manager (600) determines that a portion of the storage resources of the solid state disk (626) of the information handling system B (620) and its system control processor (624) also need to be allocated to the composed information handling system.

Based on this determination, a first message, at step 4, indicating these resources of the information handling system A (610) is sent to the system control processor (614).

The message indicates that the compute resource set A (612), graphics processing unit (616), and one terabyte of the solid state disk (626) storage space is to be allocated to the composed information handling system.

In response to the first message, at step 5, the system control processor (614) prepares the graphics processing unit (616) for allocation. To do so, at step 6, the system control processor (614) sets the state of the graphics processing unit (616) consistent with drivers employed by the system control processor (614) for communications purposes.

At step 7, the system control processor (614) sends a message to the system control processor (624) of the information handling system B (620) requesting that one terabyte of the solid state disk (626) be prepared for presentation to the compute resource set A (612). In response to the message, at step 8, the system control processor (624) determines that the one terabyte portion of the solid state disk (626) would be best presented by virtualizing the resources of the solid state disk (626). Consequently, at step 9, the system control processor (624) instantiates the solid state disk (626) as a virtualized disk so that, at step 10, only one terabyte of the four terabytes of the solid state disk (626) can be presented to the compute resource set A (612).

Once the graphics processing unit (616) and solid state disk (626) have been prepared for presentation, the system control processor (614) ascertains that data stored by the composed information handling system is to be provided error correction code protection. Consequently, at step 11, the system control processor (614) instantiates appropriate error correction code application programming so that when data is received from the compute resource set A (612), the application hosted by the system control processor (614) encodes the data prior to forwarding to the system control processor (624) for storage in the solid state disk (626).

Finally, at step 12, the prepared resources are presented by the system control processor (614) as bare metal resources to the compute resource set A (612). Consequently, the compute resource set A (612) is able to utilize the prepared resources without being required to take into account the methods by which the underlying hardware resources are being managed.

For example, when the compute resource set A (612) needs to store data (e.g., due to the virtual reality application of the composed information handling system executing via the processor of the compute resource set A (612)), the compute resource set A (612) merely sends a bare metal storage instruction for the data to the system control processor (614). Once received, the system control processor (614) encodes the data and forwards it to the system control processor (624) of information handling system B (620). The system control processor (624) then utilizes address translation tables for the virtualized storage resources of the solid state disk (626) to ascertain where (i.e., the physical storage addresses) to store the data in the storage resources of the solid state disk (626) consistent with the virtualization of these storage resources.

Thus, at this point in time illustrated in FIG. 6.1, the computing resources of the information handling systems (610, 620) have been allocated in a manner that enables a virtual reality application to be executed which neither information handling system in isolation could respectively host.

Turning to FIG. 6.4, at a second point, after the first composed information handling system for execution of the virtual reality application has been instantiated, the client (602), at step 20, determines that it requires the services of a database application and sends an composition request to the system control processor manager (600) to have a second composed information handling system be instantiated.

In response to the request and at step 23, the system control processor manager (600) identifies the computing resources necessary to support execution of the database application using the database application entry (662) of the table illustrated in FIG. 6.3. Using the identified computing resources, the system control processor manager (600) identifies, using the telemetry data map (640) of FIG. 6.2, that the information handling system B (620) has the computing resources necessary to support the database application.

Based on the identified computing resources of information handling system B (620), the system control processor generates and sends a message to the system control processor (624) of information handling system B (620). The message requests that the compute resource set B (622) and one terabyte of the storage resources of the solid state disk (626) may be allocated to the second composed information handling system.

At step 24, the system control processor (624), in response to receiving the message, determines that one terabyte of the solid state disk (626) should be presented by virtualizing another terabyte of the solid state disk (626). Accordingly, at step 25, the system control processor (624) generates an appropriate address translation table consistent with the existing virtualization of the solid state disk (626) to present an additional terabyte of storage. At step 26, the system control processor (624) uses the address translation table to obtain another virtual disk having one terabyte of storage resources.

At step 27, the system control processor (624) ascertains that the data for the database is to be mirrored (e.g., indicated by the control resources (666) of FIG. 6.3). Accordingly, the system control processor (624) begins execution of an application that mirrors writes to the second virtual disk as well as the first virtual disk, both virtual disks being hosted by the solid state disk (626).

In step 28, the system control processor (624) presents the second virtual disk to the compute resource set B (622) as bare metal resources to obtain the second composed information handling system. When the database application begins execution on a processor of the compute resource set B (622), data sent to the system control processor (624) for storage will automatically be mirrored and stored in the second virtual disk as well as the first virtual disk in a manner that is transparent to the database application. Consequently, a desired level of data protection is provided to the database application's data.

Turning to FIG. 6.5, at this point in time, two composed information handling systems (680, 690) have been instantiated. The first composed information handling system (680) which hosts the virtual reality application uses the compute resource set A (612), the system control processor (614), the system control processor (624), the graphics processing unit (616), and the solid state disk (626). In contrast, the second composed information handling system (690) which hosts the database application uses the compute resource set B (622), system control processor (624), and the solid state disk (626).

End of Example

Thus, as illustrated in FIGS. 6.1-6.5, embodiments of the invention may provide a system that enables improved computer implemented services to be provided using dynamically instantiated composed information handling systems via efficient computing resource allocation.

Figure 7:
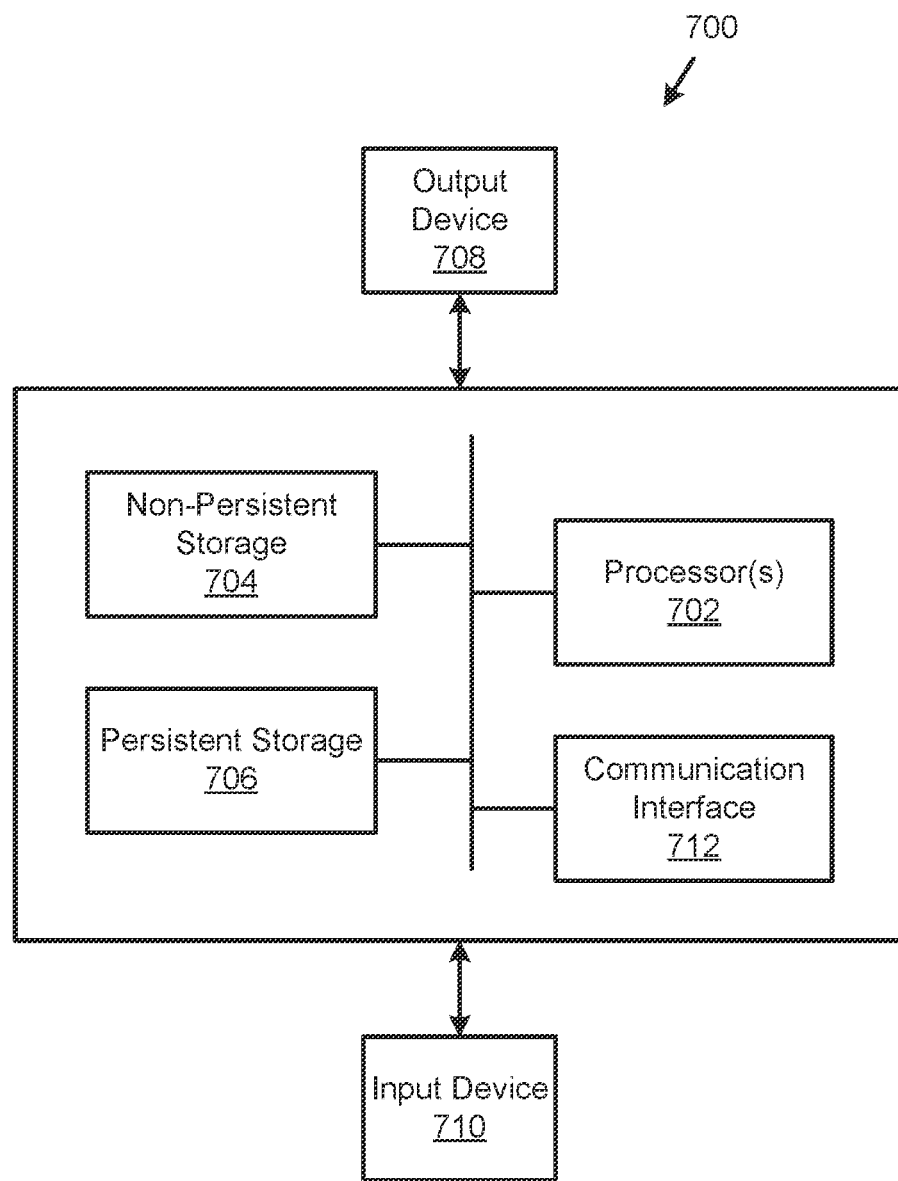
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a system and method for dynamically instantiated composed information handling systems. Specifically, embodiments of the invention may provide a system control processor manager which instantiates composed information handling systems by managing the operation of system control processors. The system control processors may be used to allocate computing resources to different composed information handling systems by controlling the presentation of hardware resources to compute resource sets.

Thus, embodiments of the invention may address the problem of resource allocation for composed systems. For example, by utilizing a system control processor manager, the limited resources of multiple information handling systems may be efficiently allocated to provide desired computer implemented services.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. A device for managing composition of composed information handling systems (IHSs), comprising:
  persistent storage; and
  a computer processor (CP) programmed to:
    obtain, from a user, a composition request (CR) for a composed IHS of the composed IHSs;
    make a determination that the CR is an intent based request, wherein the intent based request specifies a set of predetermined characteristics that the user wants to have in the composed IHS without specifying makes, types, and quantities of computing resources to be allocated to the composed IHS,
    wherein the set of predetermined characteristics comprises a first characteristic that the composed IHS executes a workload, a second characteristic that the composed IHS provides a service, and a third characteristic that the composed IHS employs a security model,
    wherein, based on a lookup table, the CP heuristically converts the intent based request into required computing resources, wherein the required computing resources specifies makes, types, and quantities of computing resources required to be allocated to the composed IHS to satisfy the set of predetermined characteristics;
    in response to the determination:
      identify, based on the required computing resources, a physical compute resource set of a first IHS, wherein, based on the first identification, the CP sends a first request to a first system control processor of the first IHS to allocate the physical compute resource set for the composed IHS;
      identify, based on the required computing resources, a physical hardware resource set of a second IHS, wherein, based on the second identification, the CP sends a second request to a second system control processor of the second IHS to allocate the physical hardware resource set for the composed IHS;
      identify, based on the required computing resources, a physical control resource set of a third IHS, wherein, based on the third identification, the CP sends a third request to a third system control processor of the third IHS to allocate the physical control resource set for the composed IHS; and
      instantiate the composed IHS based on the physical compute resource set, the physical hardware resource set, and the physical control resource set, wherein the physical control resource set supports an in-band connection to assist the composed IHS for servicing the user and an out-of-band connection to manage the composed IHS.

2. The device of claim 1, wherein the physical control resource set comprises the third system control processor adapted to provide virtualization services for a physical hardware resource of the third IHS set when providing management services.

3. The device of claim 2, wherein the third system control processor is further adapted to provide, while providing the management services, emulation services to a physical compute resource set of the third IHS using the physical hardware resource set of the third IHS.

4. The device of claim 3, wherein the virtualization services and the emulation services are transparent to all applications executing using the physical compute resource set of the instantiated composed IHS.

5. The device of claim 1, further comprising:
   setting up management services for the physical hardware resource set using a physical control resource set of the second IHS to obtain logical hardware resources further comprises:
      making a second determination that, based on a workload type, redundancy is required; and
      in response to the second determination:
         allocating redundant hardware resources for redundant performance of the workload type while the logical hardware resources are presented to a physical compute resource set of the second IHS as the bare metal resources.

6. The device of claim 5, wherein allocating the redundant hardware resources causes, when a workload of the workload type is being performed by the instantiated composed IHS, two instances of the workload to be performed by the respective redundant hardware resources when only a single instance of the workload is requested to be performed.

7. The device of claim 6, wherein allocating the redundant hardware resources further causes output of one of the two instances of the workloads to be provided to the physical compute resource set of the second IHS as the output of the of the single instance of the workload requested to be performed.

8. The device of claim 5, wherein the redundant hardware resources are allocated by programming the physical control resource set of the second IHS to, without notifying the physical compute resource set of the second IHS, instantiate duplicative copies of a workload that has been requested to be performed using the physical hardware resource set of the second IHS.

9. The device of claim 5, wherein redundant performance of the workload type comprises:
   obtaining a first output of one of the redundant workloads from a first hardware resource set of the physical hardware resource set of the second IHS;
   obtaining a second output a second of the redundant workloads from a second hardware resource set of the physical hardware resource set of the second IHS;
   making a third determination, based on the first output and the second output, that one of the first hardware resource set and the second hardware resource set is a failed hardware resource set;
   in response to the third determination:
      discard one of the first output and the second output based on the failed hardware resource set to identify a correct output; and
      provide the correct output to the physical compute resource set of the instantiated composed IHS to satisfy the workload type.

10. The device of claim 1,
    wherein the first IHS and the second IHS are distinct devices operably connected to each other and an external resource via one or more networks.

11. The device of claim 10, wherein the physical hardware resource set comprises first hardware resources that are distinct from second hardware resources of a physical hardware resource set of the first IHS.

12. The device of claim 10, wherein at least a first portion of the physical hardware resource set is exclusively utilized by the composed IHS, wherein at least a second portion of the physical hardware resource set is exclusively utilized by a second composed IHS of the composed IHSs, wherein first portion of the physical hardware resource set and the second portion of the physical hardware resource set are different from each other.

13. A method for dynamically instantiating composed information handling systems (IHSs), comprising:
    obtaining, from a user, a composition request (CR) for a composed IHS of the composed IHSs;
    making a determination that the composition request is an intent based request, wherein the intent based request specifies a set of predetermined characteristics that the user wants to have in the composed IHS without specifying makes, types, and quantities of computing resources to be allocated to the composed IHS,
    wherein the set of predetermined characteristics comprises a first characteristic that the composed IHS executes a workload, a second characteristic that the composed IHS provides a service, and a third characteristic that the composed IHS employs a security model,
    wherein, based on a lookup table, a computer processor (CP) heuristically converts the intent based request into required computing resources, wherein the required computing resources specifies makes, types, and quantities of computing resources required to be allocated to the composed IHS to satisfy the set of predetermined characteristics;
    in response to the determination:
       identifying, based on the required computing resources, a physical compute resource set of a first IHS,
          wherein, based on the first identification, the CP sends a first request to a first system control processor of the first IHS to allocate the physical compute resource set for the composed IHS;
       identifying, based on the required computing resources, a physical hardware resource set of a second IHS,
          wherein, based on the second identification, the CP sends a second request to a second system control processor of the second IHS to allocate the physical hardware resource set for the composed IHS;
       identifying, based on the required computing resources, a physical control resource set of a third IHS,
          wherein, based on the third identification, the CP sends a third request to a third system control processor of the third IHS to allocate the physical control resource set for the composed IHS; and
       instantiating the composed IHS based on the physical compute resource set, the physical hardware resource set, and the physical control resource set, wherein the physical control resource set supports an in-band connection to assist the composed IHS for servicing the user and an out-of-band connection to manage the composed IHS.

14. The method of claim 13, wherein the physical control resource set comprises the third system control processor adapted to provide virtualization services for a physical hardware resource set of the third IHS when providing management services.

15. The method of claim 14, wherein the third system control processor is further adapted to provide, while providing the management services, emulation services to a physical compute resource set of the third IHS using the physical hardware resource set of the third IHS.

16. The method of claim 15, wherein the virtualization services and the emulation services are transparent to all applications executing using the physical compute resource set of the instantiated composed IHS.

17. The method of claim 13, further comprising:
setting up management services for the physical hardware resource set using a physical control resource set of the second IHS to obtain logical hardware resources comprises:
making a second determination that, based on a workload type, redundancy is required; and
in response to the second determination:
allocating redundant hardware resources for redundant performance of the workload type while the logical hardware resources are presented to a physical compute resource set of the second IHS as the bare metal resources.

18. The method of claim 17, wherein allocating the redundant hardware resources causes, when a workload of the workload type is being performed by the instantiated composed IHS, two instances of the workload to be performed by the respective redundant hardware resources when only a single instance of the workload is requested to be performed.

19. The method of claim 18, wherein allocating the redundant hardware resources further causes output of one of the two instances of the workloads to be provided to the physical compute resource set of the second IHS as the output of the of the single instance of the workload requested to be performed.

20. A non-transitory computer readable medium comprising computer readable program code, which when executed by a computer processor enables the computer processor to perform a method for dynamically instantiating composed information handling systems (IHSs), the method comprising:
obtaining, from a user, a composition request (CR) for a composed IHS of the composed IHS s;
making a determination that the composition request is an intent based request, wherein the intent based request specifies a set of predetermined characteristics that the user wants to have in the composed IHS without specifying makes, types, and quantities of computing resources to be allocated to the composed IHS,
wherein the set of predetermined characteristics comprises a first characteristic that the composed IHS executes a workload, a second characteristic that the composed IHS provides a service, and a third characteristic that the composed IHS employs a security model,
wherein, based on a lookup table, a computer processor (CP) heuristically converts the intent based request into required computing resources, wherein the required computing resources specifies makes, types, and quantities of computing resources required to be allocated to the composed IHS to satisfy the set of predetermined characteristics;
in response to the determination:
identifying, based on the required computing resources, a physical compute resource set of a first IHS,
wherein, based on the first identification, the CP sends a first request to a first system control processor of the first IHS to allocate the physical compute resource set for the composed IHS;
identifying, based on the required computing resources, a physical hardware resource set of a second IHS,
wherein, based on the second identification, the CP sends a second request to a second system control processor of the second IHS to allocate the physical hardware resource set for the composed IHS;
identifying, based on the required computing resources, a physical control resource set of a third IHS,
wherein, based on the third identification, the CP sends a third request to a third system control processor of the third IHS to allocate the physical control resource set for the composed IHS; and
instantiating the composed IHS based on the physical compute resource set, the physical hardware resource set, and the physical control resource set, wherein the physical control resource set supports an in-band connection to assist the composed IHS for servicing the user and an out-of-band connection to manage the composed IHS.

* * * * *

UNITED STATES PATENT AND TRADEMARK OFFICE
CERTIFICATE OF CORRECTION

| | |
|---|---|
| PATENT NO. | : 11,853,782 B2 |
| APPLICATION NO. | : 17/117038 |
| DATED | : December 26, 2023 |
| INVENTOR(S) | : Gaurav Chawla et al. |

It is certified that error appears in the above-identified patent and that said Letters Patent is hereby corrected as shown below:

In the Claims

Claim 20, Column 37, Line 43, the words "IHS s" should instead read -- IHSs --.

Signed and Sealed this
Thirteenth Day of February, 2024

Katherine Kelly Vidal
*Director of the United States Patent and Trademark Office*